(12) United States Patent
Li et al.

(10) Patent No.: US 10,432,928 B2
(45) Date of Patent: Oct. 1, 2019

(54) USING A CURRENT PICTURE AS A REFERENCE FOR VIDEO CODING

(71) Applicant: QUALCOMM Incorporated, San Diego, CA (US)

(72) Inventors: Xiang Li, San Diego, CA (US); Chao Pang, San Diego, CA (US); Ying Chen, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 635 days.

(21) Appl. No.: 14/663,155

(22) Filed: Mar. 19, 2015

(65) Prior Publication Data
US 2015/0271487 A1 Sep. 24, 2015

Related U.S. Application Data

(60) Provisional application No. 61/969,022, filed on Mar. 21, 2014, provisional application No. 62/000,437, filed on May 19, 2014.

(51) Int. Cl.
| | | |
|---|---|---|
| H04N 19/176 | (2014.01) | |
| H04N 19/105 | (2014.01) | |
| H04N 19/51 | (2014.01) | |
| H04N 19/139 | (2014.01) | |
| H04N 19/159 | (2014.01) | |
| H04N 19/573 | (2014.01) | |
| H04N 19/58 | (2014.01) | |

(Continued)

(52) U.S. Cl.
CPC ......... *H04N 19/105* (2014.11); *H04N 19/139* (2014.11); *H04N 19/159* (2014.11); *H04N 19/176* (2014.11); *H04N 19/503* (2014.11); *H04N 19/52* (2014.11); *H04N 19/573* (2014.11); *H04N 19/58* (2014.11)

(58) Field of Classification Search
CPC .... H04N 19/105; H04N 19/503; H04N 19/52; H04N 19/176; H04N 19/573; H04N 19/159; H04N 19/139; H04N 19/58
USPC .......................................................... 375/240
See application file for complete search history.

(56) References Cited

U.S. PATENT DOCUMENTS

| | | | | |
|---|---|---|---|---|
| 8,363,721 B2 * | 1/2013 | Tian | ................. | H04N 19/00569 375/240.12 |
| 2007/0133683 A1 * | 6/2007 | Ohgose | ................. | H04N 19/51 375/240.16 |

(Continued)

OTHER PUBLICATIONS

Response to Written Opinion dated Jul. 10, 2016, from International Application No. PCT/US2015/021866, filed on Jan. 20, 2016, 19 pp.

(Continued)

*Primary Examiner* — Susan E. Hodges
(74) *Attorney, Agent, or Firm* — Shumaker & Sieffert, P.A.

(57) ABSTRACT

An example method for encoding or decoding video data includes storing, by a video coder and in a reference picture buffer, a version of a current picture of the video data, including the current picture in a reference picture list (RPL) used to predict the current picture, and coding, by the video coder and based on the RPL, a block of video data in the current picture based on a predictor block of video data included in the version of the current picture stored in the reference picture buffer.

34 Claims, 8 Drawing Sheets

(51) Int. Cl.
H04N 19/52 (2014.01)
H04N 19/503 (2014.01)

(56) References Cited

U.S. PATENT DOCUMENTS

| | | | |
|---|---|---|---|
| 2010/0118940 A1* | 5/2010 | Yin | H04N 19/105 375/240.12 |
| 2012/0287995 A1* | 11/2012 | Budagavi | H04N 19/11 375/240.12 |
| 2012/0328004 A1 | 12/2012 | Coban et al. | |
| 2013/0188719 A1* | 7/2013 | Chen | H04N 19/00684 375/240.16 |
| 2013/0272403 A1* | 10/2013 | Ramasubramonian | H04N 19/50 375/240.13 |
| 2014/0086325 A1 | 3/2014 | Chen et al. | |
| 2014/0185682 A1 | 7/2014 | Chen et al. | |
| 2014/0376634 A1 | 12/2014 | Guo et al. | |
| 2014/0376641 A1* | 12/2014 | Sullivan | H04N 19/105 375/240.25 |
| 2015/0016533 A1 | 1/2015 | Pang et al. | |
| 2015/0055703 A1 | 2/2015 | Pang et al. | |
| 2015/0063454 A1 | 3/2015 | Guo et al. | |
| 2015/0071357 A1 | 3/2015 | Pang et al. | |
| 2015/0098504 A1 | 4/2015 | Pang et al. | |
| 2015/0264383 A1* | 9/2015 | Cohen | H04N 19/593 375/240.16 |

OTHER PUBLICATIONS

Second Written Opinion from International Application No. PCT/US2015/021866, dated Apr. 5, 2016, 5 pp.
Response to Second Written Opinion dated Apr. 5, 2016, from International Application No. PCT/US2015/021866, filed on Jun. 3, 2016, 19 pp.
International Preliminary Report on Patentability from International Application No. PCT/US2015/021866, dated Jun. 30, 2016, 9 pp.
Flynn D., et al., "High Efficiency Video Coding (HEVC) Range Extensions text specification: Draft 4", JCT-VC Meeting; Vienna; (Joint Collaborative Team on Video Coding of ISO/IEC JTC1/SC29/WG11 and ITU-T SG.16); URL: http://wftp3.1tu.int/av-arch/jctvc-site/, No. JCTVC-N1005-v3, XP030114950, Jul. 25-Aug. 2, 2013, pp. 1-321.
International Search Report and Written Opinion from International Application No. PCT/US2015/021866, dated Jul. 10, 2015, 12 pp.
Sullivan G.J et al., "Meeting Report of 15th JCT-VC Meeting", 15. JCT-VC Meeting ; Geneva; (Joint Collaborative Team on Video Coding of ISO/ IEC JTC1/SC29/WG11 and ITU-T SG.16); URL: http://wftp3.1tu.int/av-arch/jctvc-site/, No. JCTVC-O1000, XP030115455, Oct. 23-Nov. 11, 2013, 157 pp.
Yu S-L., et al., "New Intra Prediction using Intra-Macroblock Motion Compensation", Joint Video Team (JVT) of ISO/IEC MPEG & ITU-T VCEG (ISO/IEC JTC1/SC29/WG11 and ITU-T SG16 Q.6), JVT-C151, 3rd Meeting: Fairfax, Virginia, USA, May 6, 2002, pp. 1-3, XP008158737.
Rapaka et al., "On Parallel processing capability of intro block copy", Joint Collaborative Team on Video Coding (JCT-VC) of ITU-T SG 16 WP 3 (ISO/IEC JTC 1/SC 29/WG 11), JCTVC-S0220, 19th Meeting: Strasbourg, FR, Oct. 17-24, 2014, 8 pp.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, JCTVC-N1003, 14th Meeting, Vienno, AT, Jul. 25-Aug. 3, 2013, 311 pp.
Pang C., et al., "Non-RCE3: Intra Motion Compensation with 2-D MVs", 14. JCT-VC Meeting; Vienna; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256-v4, XP030114777, Jul. 25-Aug. 2, 2013, pp. 1-12.
Flynn D., et al., "High Efficiency Video Coding (HEVC) Range Extensions text specification: Draft 6", 16. JCT-VC Meeting; ; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1005-v1, XP030115878. Jan. 9-17, 2014, 356 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Pang et al., "Non-Ce2 Test 1: Intra Block copy and inter signalling unification", Joint Collaborative Team on Video Coding (JCT-VC) of ITU-T SG 16 WP 3 and ISO/IEC JTC 1/SC 29/WG 11, JCTVC-T0227, 20th Meeting, Geneva, CH, Feb. 10-18, 2015, 3 pp.
U.S. Appl. No. 61/838,025, by Chao Pang, filed Dec. 6, 2013.
U.S. Appl. No. 61/893,794, by Chao Pang, filed Oct. 21, 2013.
Wang, Ye-Kui, et al., "High Efficiency Video Coding (HEVC) Defect Report 2", 15, JCT-VC Meeting, Geneva, CH; (Joint Collaborative Team on Video Coding (JCT-VC) of ITU-T SG 16 WP 3 and ISO/IEC JTC 1/SC 29/WG 11); URL: http://phenix.int-evry.fr/jct/doc_end_user/documents/15_Geneva/wg11/JCTVC-O1003-v2.zip, Oct. 23-Nov. 1, 2013, 311 pp.
Yu et al., "Requirements for an extension of HEVC for coding of screen content," ISO/IEC JTC 1/SC 29/WG 11 Requirements subgroup, San Jose, California, USA, document MPEG2013/N14174, Jan. 2014. 5 pp.
Joshi, Rajan et al., "High Efficiency Video Coding (HEVC) Screen Content Coding: Draft 2", 19. JCT-VC Meeting, Oct. 17-24, 2014, Strausbourg, FR; (Joint Collaborative Team on Video Coding (JCT-VC) of ITU-T SG 16 WP 3 and ISO/IEC JTC 1/SC 29/WG 11), JCTVC-S1005, 374 pp.

* cited by examiner

USING A CURRENT PICTURE AS A REFERENCE FOR VIDEO CODING

This application claims the benefit of U.S. Provisional Application No. 61/969,022, filed Mar. 21, 2014, and U.S. Provisional Application No. 62/000,437, filed May 19, 2014, the entire contents of each of which is incorporated by reference herein in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques for performing Intra-prediction for video coding. More particularly, this disclosure describes example techniques for using a current picture as a reference picture when coding one or more blocks of the current picture. For instance, a current picture may be used as a reference picture when coding one or more blocks of the current picture using Intra Block Copying (Intra BC).

In one example, a method of encoding or decoding video data includes storing, by a video coder and in a reference picture buffer, a version of a current picture of the video data; inserting an indication of the current picture in a reference picture list (RPL) used during prediction of blocks of the current picture; and coding, by the video coder and based on the RPL, a first block of video data in the current picture based on a predictor block of video data included in the version of the current picture stored in the reference picture buffer. In some examples, the predictor block may alternatively be referred to as a prediction block.

In another example, a device for encoding or decoding video data includes a reference picture buffer configured to store one or more pictures of the video data, and one or more processors. In this example, the one or more processors are configured to: store, in a reference picture buffer, a version of a current picture of the video data; insert an indication of the current picture in a reference picture list (RPL) used during prediction of blocks of the current picture; and coding, by the video coder and based on the RPL, a first block of video data in the current picture based on a predictor block of video data included in the version of the current picture stored in the reference picture buffer.

In another example, a device for encoding or decoding video data includes means for storing, in a reference picture buffer, a version of a current picture of the video data; means for inserting an indication of the current picture in a reference picture list (RPL) used during prediction of blocks of the current picture; and means for coding, based on the RPL, a first block of video data in the current picture based on a predictor block of video data included in the version of the current picture stored in the reference picture buffer.

In another example, a computer-readable storage medium stores instructions that, when executed, cause one or more processors of a video coder to: store, in a reference picture buffer, a version of a current picture of the video data; insert an indication of the current picture in a reference picture list (RPL) used during prediction of blocks of the current picture; and code, based on the RPL, a first block of video data in the current picture based on a predictor block of video data included in the version of the current picture stored in the reference picture buffer.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
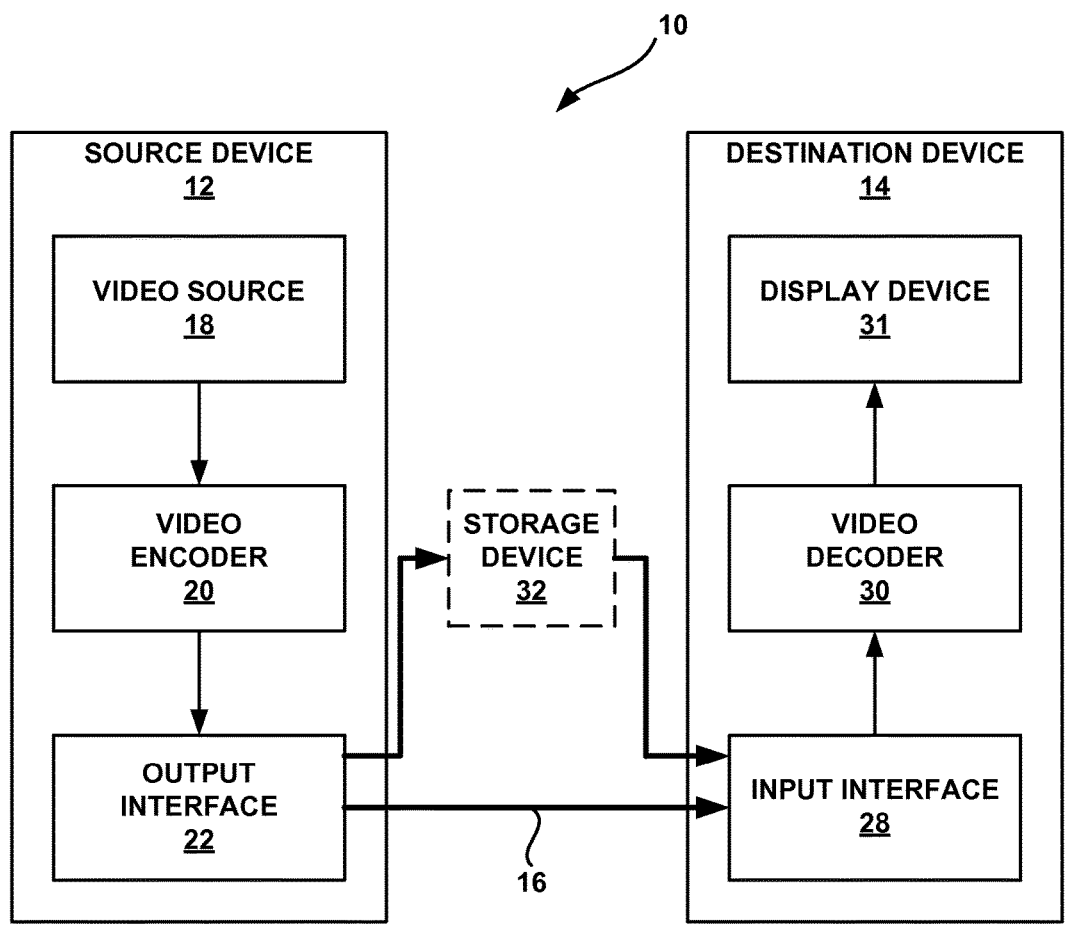
FIG. 1 is a block diagram illustrating an example video encoding and decoding system that may implement the techniques of this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for pixels in the block and coding residual values. The prediction values are formed using pixel samples in one or more predictive blocks. The residual values represent the differences between the pixels of the original block and the predicted pixel values. Specifically, the original block of video data includes an array of pixel values, and the predicted block includes an array of predicted pixel values. The residual values represent to pixel-by-pixel differences between the pixel values of the original block and the predicted pixel values.

Prediction techniques for a block of video data are generally categorized as intra-prediction and inter-prediction. Intra-prediction, or spatial prediction, does not include prediction from any reference picture, instead the block is predicted from pixel values of neighboring, previously coded blocks. Inter-prediction, or temporal prediction, generally involves predicting the block from pixel values of one or more previously coded reference pictures (e.g., frames or slices) selected from one or more reference picture lists (RPLs). A video coder may include one or more reference picture buffers configured to store the pictures included in the RPLs.

Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics region, repeated patterns (such as characters, icons, symbols, etc.) often exist. Intra Block Copying (Intra BC) is a technique which may enable a video coder to remove such redundancy and improve intra-picture coding efficiency. In some instances, Intra BC alternatively may be referred to as Intra motion compensation (MC).

According to some Intra BC techniques, video coders may use blocks of previously coded video data, within the same picture as the current block of video data, that are either directly above or directly in line horizontally with a current block (to be coded) of video data in the same picture for prediction of the current block. In other words, if a picture of video data is imposed on a 2-D grid, each block of video data would occupy a unique range of x-values and y-values. Accordingly, some video coders may predict a current block of video data based on blocks of previously coded video data that share only the same set of x-values (i.e., vertically in-line with the current block) or the same set of y-values (i.e., horizontally in-line with the current block).

Other Intra BC techniques, are described in Pang et al., "Non-RCE3: Intra Motion Compensation with 2-D MVs," Document: JCTVC-N0256, JCT-VC of ITU-T SG 16 WP 3 and ISO/IEC JTC 1/SC 29/WG 11, 14$^{th}$ Meeting: Vienna, AT 25 Jul.-2 Aug. 2013 (hereinafter "JCTVC-N0256"). At the JCT-VC meeting in Vienna (July 2013), Intra BC was adopted in the High Efficiency Video Coding (HEVC) Range Extension standard. According to JCTVC-N0256, a video coder may determine a two-dimensional motion vector which identifies a prediction block within the same picture as the current block. In some examples, the motion vector may also be referred to as a block vector, an offset vector, or a displacement vector. In any case, the two-dimensional motion vector has a horizontal displacement component and a vertical displacement component, each of which may be zero or non-zero. The horizontal displacement component represents a horizontal displacement between the predictive block of video data, or prediction block, and a current block of video data and the vertical displacement component represents a vertical displacement between the prediction block of video data and the current block of video data. For Intra BC, the pixels of the predictive block may be used as predictive samples for corresponding pixels in the block (i.e., the current block) that is being coded. The video coder may additionally determine a residual block of video data based on the current block of video data and the prediction block, and code the two-dimensional motion vector and the residual block of video data.

In some examples, Intra BC may be an efficient coding tool, especially for screen content coding. For instance, in some examples, coding blocks using Intra BC may result in a smaller bitstream that coding blocks using inter or intra coding. As discussed above, Intra BC is an inter-alike coding tool (meaning that pixel values for a picture are predicted from other pixel values in the picture). However, in some examples, it may be difficult to integrate Intra BC into conventional intra pictures due to one or more constraints applied to Intra BC, which may not preferred in practical design. Some example constraints include, but are not limited to, that the predictor block be within the same slice or tile as the current block to be coded, that the predictor block not overlap the current block to be coded, that all pixels in the predictor block be reconstructed, that the predictor block be within a certain region (e.g., due to considerations relating to parallelization implementation as described in Rapaka et al., "On parallel processing capability of intra block copy," Document: JCTVC-50220, JCT-VC of ITU-T SG 16 WP 3 and ISO/IEC JTC 1/SC 29/WG 11, 19$^{th}$ Meeting: Strasbourg, FR 17-24 Oct. 2014), and, when constrained intra prediction is enabled, that the predictor block does not include any pixel coded using the conventional inter mode. Additionally, in some examples, the hardware architecture for conventional intra and inter frames may not be reused for Intra BC without modification (e.g., due to Intra BC resulting in block copy inside a picture). As such, it may be desirable to enable a video coder to gain the efficiencies provided by Intra BC while maintaining some or all of the constraints currently applied to Intra BC, and without (significant) modification to the hardware architecture.

In accordance with one or more techniques of this disclosure, as opposed to predicting a block of a current picture based on samples in the current picture using conventional intra prediction techniques, a video coder may perform Intra BC to predict a block in a current picture based on samples in the current picture using techniques similar to conventional inter prediction. For instance, a video coder may include the current picture in a reference picture list (RPL) used to predict the current picture, store a version of the current picture in a reference picture buffer, and code the block of video data in the current picture based on a predictor block of video data included in the version of the current picture stored in the reference picture buffer. In this way, a video coder may gain the efficiencies provided by Intra BC while maintaining some or all of the constraints currently applied to Intra BC. Also in this way, a video coder may reuse the hardware architecture for conventional intra and inter frames for Intra BC without significant modification.

This disclosure describes example techniques related to utilizing a current picture as a reference picture when predicting portions of the current picture. To assist with understanding, the example techniques are described with respect to range extensions (RExt) to the High Efficiency Video Coding (HEVC) video coding standard, including the support of possibly high bit depth, (more than 8 bit), high chroma sampling format, including 4:4:4 and 4:2:2. The techniques may also applicable for screen content coding. It should be understood that the techniques are not limited to range extensions or screen content coding, and may be applicable generally to video coding techniques including standards based or non-standards based video coding. Also, the techniques described in this disclosure may become part of standards developed in the future. In other words, the techniques described in this disclosure may be applicable to previously developed video coding standards, video coding standards currently under development, and forthcoming video coding standards.

FIG. 1 is a block diagram illustrating an example video encoding and decoding system 10 that may implement the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 of source device 12 to a storage device 32. Similarly, encoded data may be accessed from the storage device 32 by input interface 28 of destination device 14. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may store the encoded video generated by source device 12.

Destination device 14 may access stored video data from the storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for improved intra block copy signaling in video coding may be performed by any digital video encoding and/or decoding device. Although generally the techniques of this disclosure are performed by a video encoding or decoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16 or storage device 32. The information of computer-readable medium 16 or storage device 32 may include syntax information defined by video encoder 20, which is also used by video decoder 30, that includes syntax elements that describe characteristics and/or processing of blocks and other coded units, e.g., GOPs. Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard. While the techniques of this disclosure are not limited to any particular coding standard, the techniques may be relevant to the HEVC standard, and particularly to the extensions of the HEVC standard, such as the RExt extension. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Video encoder 20 and video decoder 30 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views. Intra-mode (I mode) may refer to any of several spatial based compression modes. Inter-modes, such as uni-directional prediction (P mode) or bi-prediction (B mode), may refer to any of several temporal-based compression modes.

In some examples, such as when coding screen content, video encoder 20 and/or video decoder 30 may perform intra block copying (Intra BC) to code blocks within video slices. To perform Intra BC, video encoder 20 and/or video decoder 30 may use blocks of previously coded video data that are in the same picture as a current block for prediction of the current block. As discussed above, Intra BC is an inter-alike coding tool (meaning that pixel values for a picture are predicted based on a predictor block indicated by a vector). However, using Intra BC in conventional intra prediction pictures may increase the complexity and/or reduce the coding efficiency of Intra BC. Additionally, prior to the techniques of this disclosure, implementations of video coders using Intra BC would need to be configured with additional tools to perform Intra BC, relative to those used to perform conventional intra- and inter-prediction (e.g., due to Intra BC resulting in block copy inside a picture). As such, it may be desirable to enable a video coder to gain the efficiencies provided by Intra BC while maintaining some or all of the constraints currently applied to Intra BC, and without (significant) modification to the hardware architecture.

In accordance with one or more techniques of this disclosure, as opposed to performing Intra BC to predict a block of a current picture using conventional intra prediction techniques, video encoder 20 and/or video decoder 30 may perform Intra BC using techniques similar to conventional inter prediction. For instance, video encoder 20 and/or video decoder 30 may insert an indication of the current picture in a reference picture list (RPL) used to predict blocks of the current picture, store a version (i.e., an instance) of the current picture in a reference picture buffer, and code the block of video data in the current picture based on a predictor block of video data included in the version of the current picture stored in the reference picture buffer. In this way, encoder 20 and/or video decoder 30 may gain the efficiencies provided by Intra BC while maintaining some or all of the constraints currently applied to Intra BC. Also in this way, encoder 20 and/or video decoder 30 may reuse the hardware architecture for conventional intra and inter frames for Intra BC without significant modification.

Figure 2:
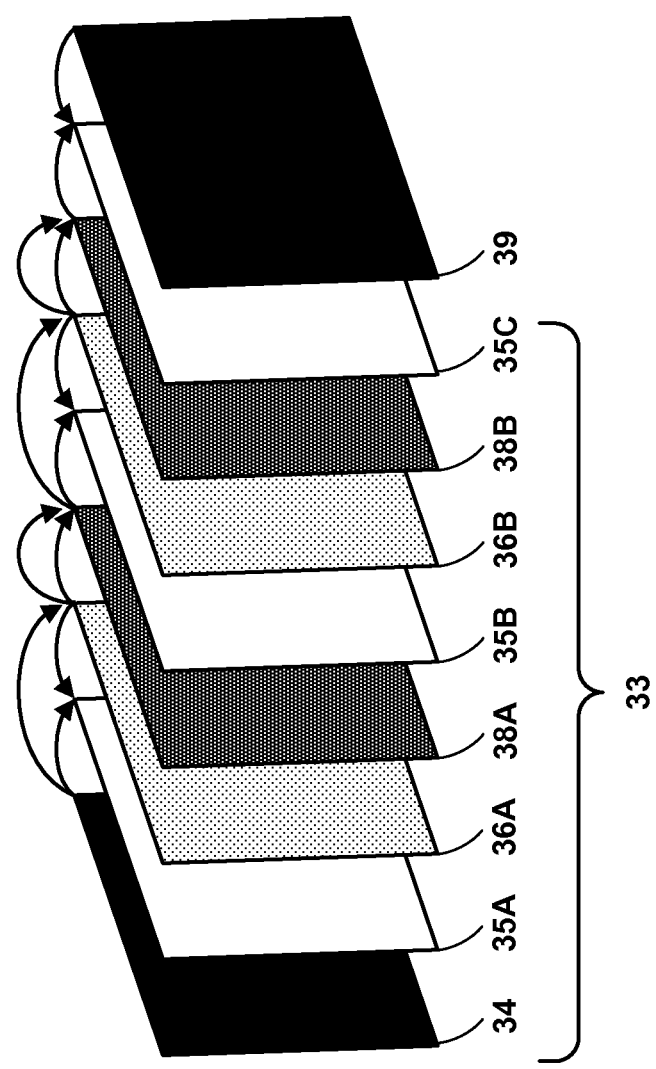
FIG. 2 is a conceptual diagram illustrating an example video sequence of pictures, in accordance with one or more techniques of this disclosure.

FIG. 2 is a conceptual diagram illustrating an example video sequence 33 that includes pictures 34, 35A, 36A, 38A, 35B, 36B, 38B, and 35C, in display order. One or more of these pictures may include P-slices, B-slices, or I-slices. In some cases, video sequence 33 may be referred to as a group of pictures (GOP). Picture 39 is a first picture in display order for a sequence occurring after video sequence 33. FIG. 2 generally represents an example prediction structure for a video sequence and is intended only to illustrate the picture references used for encoding different inter-predicted slice types. An actual video sequence may contain more or fewer video pictures that include different slice types and in a different display order.

For block-based video coding, each of the video pictures included in video sequence 33 may be partitioned into video blocks or coding units (CUs). Each CU of a video picture may include one or more prediction units (PUs). In some examples, the prediction methods available to predict PUs within a picture may depend on the picture type. As one example, video blocks or PUs in slices of an intra-predicted picture (an I-picture) may be predicted using intra-prediction modes (i.e., spatial prediction with respect to neighboring blocks in the same picture). As another example, video blocks or PUs in slices of an inter-predicted picture (a B-picture or a P-picture) may be predicted using inter or intra-prediction modes (i.e., spatial prediction with respect to neighboring blocks in the same picture or temporal prediction with respect to other reference pictures). In other words, an I-picture may include I-slices, a P-picture may include both I-slices and P-slices, and a B-picture may include I-slices, P-slices, and B-slices.

Video blocks of a P-slice may be encoded using uni-directional predictive coding from a reference picture identified in a reference picture list. Video blocks of a B-slice may be encoded using bi-directional predictive coding from multiple reference picture identified in multiple reference picture lists.

In the example of FIG. 2, first picture 34 is designated for intra-mode coding as an I-picture. In other examples, first picture 34 may be coded with inter-mode coding, e.g., as a P-picture, or B-picture, with reference to a first picture of a preceding sequence. Video pictures 35A-35C (collectively "video pictures 35") are designated for coding as B-pictures using bi-prediction with reference to a past picture and a future picture. As illustrated in the example of FIG. 2, picture 35A may be encoded as a B-picture with reference to first picture 34 and picture 36A, as indicated by the arrows from picture 34 and picture 36A to video picture 35A. In the example of FIG. 2, first picture 34 and picture 36A may be included in reference picture lists used during prediction of blocks of picture 35A. Pictures 35B and 35C are similarly encoded.

Video pictures 36A-36B (collectively "video pictures 36") may be designated for coding as P-pictures, or B-pictures, using uni-direction prediction with reference to a past picture. As illustrated in the example of FIG. 2, picture 36A is encoded as a P-picture, or B-picture, with reference to first picture 34, as indicated by the arrow from picture 34 to video picture 36A. Picture 36B is similarly encoded as a P-picture, or B-picture, with reference to picture 38A, as indicated by the arrow from picture 38A to video picture 36B.

Video pictures 38A-38B (collectively "video pictures 38") may be designated for coding as P-pictures, or B-pictures, using uni-directional prediction with reference to the same past picture. As illustrated in the example of FIG. 2, picture 38A is encoded with two references to picture 36A, as indicated by the two arrows from picture 36A to video picture 38A. Picture 38B is similarly encoded.

In some examples, each of the pictures may be assigned a unique value (that is, unique to a particular video sequence, e.g., a sequence of pictures following an instantaneous decoder refresh (IDR) picture in decoding order) that indicates the order in which the pictures are to be output. This unique value may be referred to as the picture order count (POC). In some examples, the order in which the pictures are to be output may be different than the order in which the pictures are coded. For instance, picture 35A may be output before picture 36A while picture 36A may be coded before picture 35A.

In accordance with one or more techniques of this disclosure, a video coder (e.g., video encoder 20 or video decoder 30) may perform Intra BC by inserting a current picture in a reference picture list (RPL) used to predict blocks in the current picture. For instance, in the example of FIG. 2, a video coder may insert an indication of picture 35A, along with indications of picture 34 and picture 36A, in RPLs used to predict blocks in picture 35A. The video coder may then use picture 35A as a reference picture when coding blocks of picture 35A.

Figure 3:
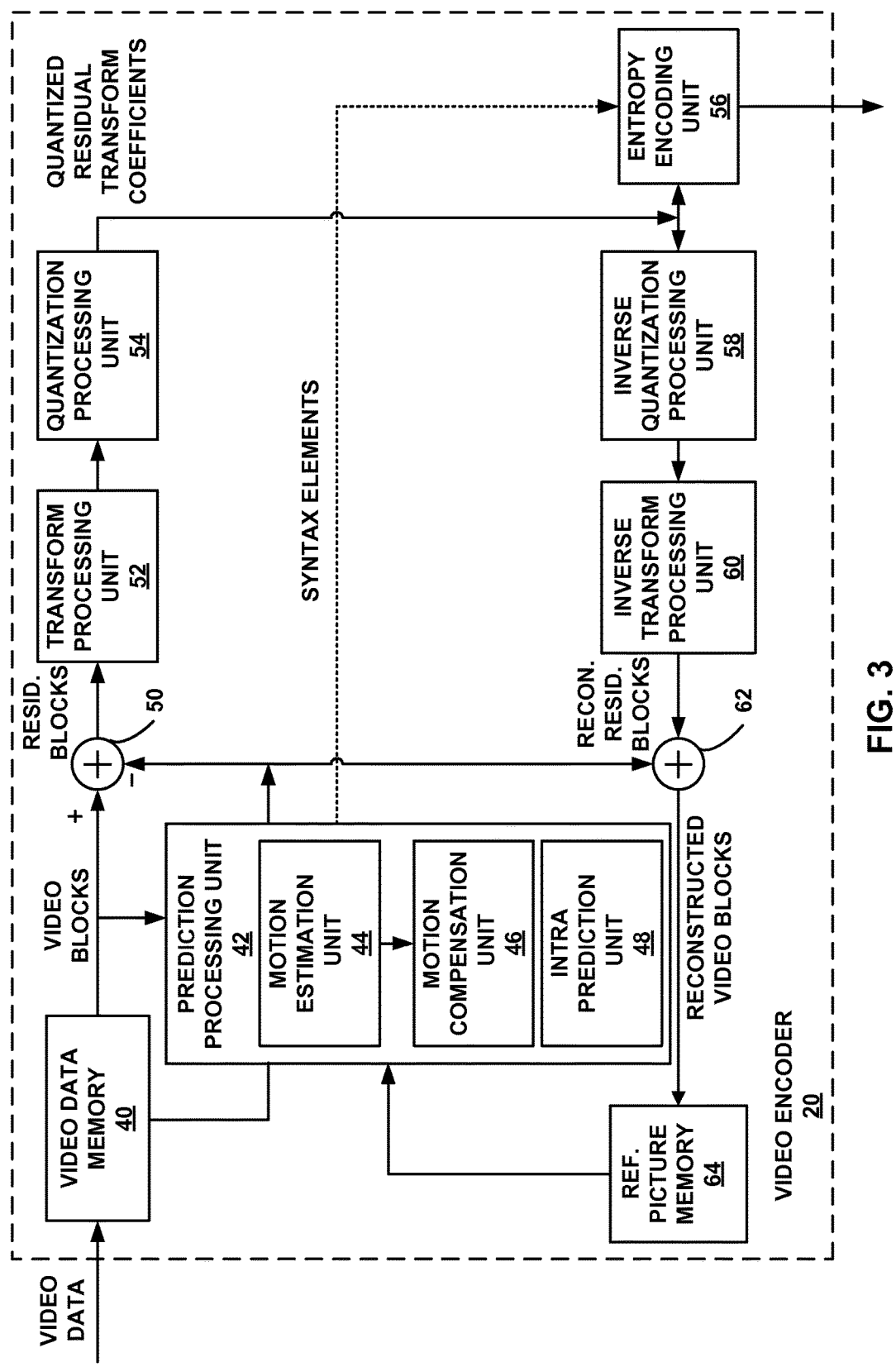
FIG. 3 is a block diagram illustrating an example of a video encoder that may use techniques for intra block copy described in this disclosure.

FIG. 3 is a block diagram illustrating an example of a video encoder 20 that may use techniques for intra block copy described in this disclosure. The video encoder 20 will be described in the context of HEVC coding for purposes of illustration, but without limitation of this disclosure as to other coding standards. Moreover, video encoder 20 may be configured to implement techniques in accordance with the range extensions of HEVC.

Video encoder 20 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views.

In the example of FIG. 3, video encoder 20 may include video data memory 40, prediction processing unit 42, reference picture memory 64, summer 50, transform processing unit 52, quantization processing unit 54, and entropy encoding unit 56. Prediction processing unit 42, in turn, includes motion estimation unit 44, motion compensation unit 46, and intra-prediction unit 48. For video block reconstruction, video encoder 20 also includes inverse quantization processing unit 58, inverse transform processing unit 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

During the encoding process, video encoder 20 receives a video picture or slice to be coded. The picture or slice may be divided into multiple video blocks. Motion estimation unit 44 and motion compensation unit 46 perform inter-predictive coding of the received video block relative to one or more blocks in one or more reference pictures to provide temporal compression or provide inter-view compression. Intra-prediction unit 48 may alternatively perform intra-predictive coding of the received video block relative to one or more neighboring blocks in the same picture or slice as the block to be coded to provide spatial compression. Video encoder 20 may perform multiple coding passes (e.g., to select an appropriate coding mode for each block of video data).

Moreover, a partition unit (not shown) may partition blocks of video data into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). Prediction processing unit 42 may further produce a quadtree data structure indicative of partitioning of an LCU into sub-CUs. Leaf-node CUs of the quadtree may include one or more PUs and one or more TUs.

Prediction processing unit 42 may select one of the coding modes, intra or inter, e.g., based on error results, and provides the resulting intra- or inter-coded block to summer 50 to generate residual block data and to summer 62 to reconstruct the encoded block for use as a reference picture. Prediction processing unit 42 also provides syntax elements, such as motion vectors, intra-mode indicators, partition information, and other such syntax information, to entropy encoding unit 56.

Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a PU of a video block in an inter-coded slice by comparing the position of the PU to the position of a predictive block of a reference picture. The reference picture may be selected from one or more reference picture lists (RPLs) which identify one or more reference pictures stored in reference picture memory 64. Motion estimation unit 44 sends the calculated motion vector to entropy encoding unit 56 and motion compensation unit 46. In some examples, motion estimation unit 44 may send an indication of the selected reference picture to entropy encoding unit 56.

In some examples, motion estimation unit 44 may generate the one or more RPLs. For instance, motion estimation unit 44 may generate a first RPL (List 0) which may include pictures of video data that are before the current picture in an output order (i.e., have lower POC values than the current picture) and a second RPL (List 1) which may include pictures of video data that are after the current picture in the output order (i.e., have higher POC values than the current picture). In some examples, the RPLs may include short-term and long-term pictures, which may be differentiated in that long-term pictures may be stored in reference picture memory 64 for longer than short-term pictures. In some examples, the picture in reference picture memory 64 may be marked, e.g., as long-term, short-term, etc.

In some examples, motion estimation unit 44 may generate the one or more RPLs based on one or more reference picture sets (RPSs). The one or more RPSs may include: 1) one or more sets of short-term pictures that are available to predict the current picture and are before the current picture in the output order, referred to as short-term RPS before or RefPicSetStCurrBefore, 2) a set of short-term pictures that are available to predict the current picture and are after the current picture in the output order, referred to as short-term RPS after or RefPicSetStCurrAfter, 3) a set of short-term pictures that are not available to predict the current picture but may be used to code subsequent picture in a coding order, referred to as short-term RPS unavailable or RefPicSetStFoll, 4) a set of long-term pictures that are available to predict the current picture, referred to as long-term RPS available or RefPicSetLtCurr, and/or 5) a set of long-term pictures that are unavailable to predict the current picture, referred to as long-term RPS unavailable or RefPicSetLtFoll.

In some examples, motion estimation unit 44 may include the pictures in the one or more RPSs in the one or more RPLs in a particular order. For instance, to generate the an RPL, motion estimation unit 44 may first include pictures in the short-term RPSs that are available to predict the current picture (e.g., RefPicSetStCurrBefore and/or RefPicSetStCurrAfter) followed by pictures in the long-term RPSs that are available to predict the current picture (e.g., RefPicSetLtCurr). In some examples, each entry in a RPL may have an index value such that pictures included in the RPL earlier (e.g., pictures in short-term RPSs) have lower index values than pictures included in the RPL later (e.g., pictures in long-term RPSs).

As discussed above, motion estimation unit 44 may send an indication of the selected reference picture to entropy encoding unit 56. In some examples, motion estimation unit 44 may send the indication by sending the index value of the selected reference picture within the RPL.

In some examples, motion estimation unit 44 may output information to enable a video decoder to predict one or more current RPLs from one or more previous RPLs. For instance, motion estimation unit 44 may cause output one or more syntax elements that enable a video decoder to modify one or more RPLs for a previous slice to generate one or more RPLs for a current slice.

In accordance with one or more techniques of this disclosure, as opposed to restricting inter-prediction to use other pictures as reference pictures, motion estimation unit 44 may use a current picture as a reference picture to predict blocks of video data included in the current picture. For example, motion estimation unit 44 may store a version of a current picture in reference picture memory 64. In some examples, motion estimation unit 44 may store an initialized version of the current picture with pixel values initialized to a fixed value. In some examples, the fixed value may be based on a bit depth of samples of the current picture. For instance, the fixed value may be 1<<(bitDepth−1). In some examples, motion estimation unit 44 may store the initialized version of the current picture before encoding any blocks of the current picture. By storing an initialized version of the current picture, motion estimation unit 44 may not be required to constrain the search for predictive blocks (i.e., a search region) to blocks that are already reconstructed. By contrast, if motion estimation unit 44 does not store an initialized version of the current picture the search for predictive blocks may be constrained to blocks that are already reconstructed to, for example, avoid a decoder/encoder mismatch.

Prediction processing unit 42 may generate one or more RPLs for the current picture. For instance, prediction processing unit 42 may include the current picture an RPL for the current picture. In some examples, prediction processing unit 42 may include the current picture at a particular location within the RPL. As one example, prediction processing unit 42 may insert the current picture in the RPL before pictures in a long-term RPS. For instance, prediction processing unit 42 may insert the current picture in the RPL with an index value less than index values of pictures from a long-term RPS. In some examples, prediction processing unit 42 may insert the current picture in the RPL directly before pictures in a long-term RPS.

As another example, prediction processing unit 42 may insert the current picture in the RPL after inserting pictures from a long-term RPS. For instance, prediction processing unit 42 may insert the current picture in the RPL with an index value greater than index values of pictures in a long-term RPS. In some examples, motion estimation unit 44 may insert the current picture in the RPL directly after inserting pictures from a long-term RPS.

As another example, prediction processing unit 42 may insert the current picture in the RPL at a fixed position. For instance, prediction processing unit 42 may insert the current picture in the RPL with a fixed index value. In some examples, the fixed index value may be −1, or num_ref_idx_11_active_minus1+1. In some of such examples, motion estimation unit 44 may not code a flag that indicates that the current block is coded using Intra BC (i.e., intra_bc_flag).

In some examples, such as where motion vectors are predicted using temporal motion vector prediction (TMVP), motion estimation unit 44 may apply one or more constraints such that the current picture is not used as the collocated picture for itself. For instance, motion estimation unit 44 may code a syntax element that specifies the reference index of the collocated picture used for TMVP (e.g., collocated_ref_idx) such that RefPicListX[collocated_ref_idx] is not the current picture where X is equal to collocated_from_10_flag.

As discussed above, when encoding a block of video data of a current picture of video data, motion estimation unit 44 may select a predictive block that closely matches the current block. In accordance with one or more techniques of this disclosure, as opposed to (or in addition to) searching blocks of other pictures, motion estimation unit 44 may select a block located in the current picture for use as a predictive block for the current block of the current picture. For example, motion estimation unit 44 may perform a search on pictures including one or more reference pictures, including the current picture. For each picture, motion estimation unit 44 may calculate search results reflecting how well a predicted block matches the current block, e.g., using pixel-by-pixel sum of absolute differences (SAD), sum of squared differences (SSD), mean absolute difference (MAD), mean squared difference (MSD), or the like. Then, motion estimation unit 44 may identify a block in a picture having the best match to the current block, and indicate the position of the block and the picture (which may be the current picture) to prediction processing unit 42. In this way, motion estimation unit 44 may perform Intra BC, e.g., when motion estimation unit 44 determines that a predicted block is included in the current picture, that is, the same picture as the current block being predicted.

In some examples, motion estimation unit 44 may restrict the search for the predictive block in the current picture. For instance, where the current block is located in a current slice, motion estimation unit 44 may restrict the search for the predictive block to previously coded areas of the current slice (e.g., areas above and/or to the left of the current block in the current slice). As such, in some examples, previously coded areas of previous slices of the current picture may not be used as predictive blocks for performing Intra BC. However, as discussed above, in some examples, the previously coded areas of previous slices of the current picture may be used as predictive blocks for performing Intra BC. In some examples, motion estimation unit 44 may restrict the search for the predictive block using similar restrictions as motion search in inter reference pictures (e.g., like search range of motion estimation).

In some examples, prediction processing unit 42 may cause entropy encoding unit 56 to encode one or more syntax elements to indicate whether a current picture may be present in an RPL used to predict the current picture. As one example, prediction processing unit 42 may cause entropy encoding unit 56 to encode a single syntax element that indicates whether pictures of the video data may be present in RPLs used to predict themselves. In some examples, prediction processing unit 42 may cause entropy encoding unit 56 to include the single syntax element in a video parameter set (VPS) referred to by the current picture, a sequence parameter set (SPS) referred to by the current picture, or a picture parameter set (PPS) referred to by the current picture.

As another example, prediction processing unit 42 may cause entropy encoding unit 56 to encode multiple syntax elements to indicate whether the current picture may be present in a RPL used to predict the current picture. For instance, prediction processing unit 42 may cause entropy encoding unit 56 to may encode a first syntax element that indicates whether pictures of the video data may be present in RPLs used to predict the respective pictures of the video data (i.e., used to predict themselves). In some examples, prediction processing unit 42 may cause entropy encoding unit 56 to include the first syntax element in a VPS referred to by the current picture, a SPS referred to by the current picture, or a PPS referred to by the current picture (or slice of the current picture). In some examples, such as where the syntax element indicates that pictures of the video data may be present in RPLs used to predict themselves, prediction processing unit 42 may cause entropy encoding unit 56 to encode a second syntax element that indicates whether the current picture of the video data may be present in the RPL used to predict the current slice. In some examples, prediction processing unit 42 may cause entropy encoding unit 56 to include the second syntax element in a slice header of the current slice.

In some examples, prediction processing unit 42 may not cause entropy encoding unit 56 to encode a syntax element that indicates whether a block is coded using Intra Block Copy (Intra BC). For instance, prediction processing unit 42 may not cause entropy encoding unit 56 to encode intra_bc_flag in the coding unit syntax of blocks that are predicted using Intra BC in accordance with the techniques of this disclosure.

In some examples, in addition to coding blocks in B-slices and P-slices using Intra BC, prediction processing unit 42 may construct one or more RPLs that include the current picture to encode blocks of an I-slice of the current picture. In some such examples, it may be assumed that the one or more RPLs only include the current picture. In some examples, prediction processing unit 42 may cause entropy encoding unit 56 to encode a syntax element to indicate whether the current picture may be used as a reference picture of I-slices included in the current picture. In some examples, prediction processing unit 42 may cause entropy encoding unit 56 to include the syntax element in a VPS referred to by the current picture, a SPS referred to by the current picture, a PPS referred to by the current picture, or a slice header of a current I-slice. In some examples, prediction processing unit 42 may still use one or both of AMVP and merge. In some examples, prediction processing unit 42 may not cause entropy encoding unit 56 to signal the target reference index for AMVP for the I-slice such that a decoder derives the target reference index as a fix value, e.g., 0. In some examples, prediction processing unit 42 may cause entropy encoding unit 56 to signal the target reference index for AMVP for the I-slice, but the value of the target reference index may be constrained to be a fix value, e.g., 0.

As discussed above, the pictures stored by reference picture memory 64 may be marked as short-term, long-term, another marking, and/or not marked. In some examples, such as when the current slice is an I-slice and Intra BC is enabled, prediction processing unit 42 may mark the current picture as either long-term or short-term. In some examples, such as when the current slice is an I-slice and Intra BC is enabled, prediction processing unit 42 may not mark the current picture as either long-term or short-term.

In some examples, prediction processing unit 42 may mark the current picture as long-term before coding the current picture and mark the current picture as short-term after coding the current picture. In some of such examples, such as where the current slice an I-slice, prediction processing unit 42 may generate a merge candidate list to contain candidates referring purely to an Intra BC reference (marked as "long-term") or other candidates that refer to Inter references (marked as "short-term"). In this way, prediction processing unit 42 may generate a candidate list to contain both Intra BC candidates and normal (Inter-prediction) candidates. In some examples, prediction processing unit 42 may bi-directionally predict a merge candidate from an Intra BC reference and an inter-prediction reference. In some of such as examples, such as where the current slice is an inter coded slice (e.g., a B-slice or a P-slice), prediction processing unit 42 may omit an additional flag indicating flag indicating whether current block is coded with Intra BC (intra_bc_flag).

In some examples, such as where temporal motion vector prediction (TMVP) is enabled and Intra BC is enabled by assuming the current frame is an additional reference picture, prediction processing unit 42 may cause entropy encoding unit 56 to code a syntax element that indicates whether the target merge reference picture is the current picture or a first picture in a RPL (e.g., either RefPicList0[0] or RefPicList1[0]). In some examples, prediction processing unit 42 may identify the reference picture by deriving or signaling a target index for a long-term (Intra BC) category of references or a short-term category of references, and applying a different target merge index based on the category of the co-located block's reference picture. For instance, prediction processing unit 42 may identify the reference picture by signaling or deriving a target index for a long-term (Intra BC) category of references or short-term category of references, and based on the category of the co-located block's reference picture, a different target merge index applies.

As discussed above, prediction processing unit 42 may determine a motion vector that represents a displacement between the current block of video data and the predictor block of video data, and output the determined vector to entropy encoding unit 56 and motion compensation unit 46. In some examples, prediction processing unit 42 may determine the motion vector with integer precision. In such examples, such as where the current picture is a marked as a long-term reference picture, prediction processing unit 42 may not use normal long-term reference pictures to predict the current picture (i.e., long-term reference pictures that are not the current picture). Also, in such examples, prediction processing unit 42 may utilize the advanced motion vector prediction (AMVP) or merge related decoding process as in HEVC version 1 without any change, e.g., as the Intra BC motion vector is predicted only based on Intra BC motion vectors of the spatial and temporal neighboring blocks.

In some examples, prediction processing unit 42 may determine the motion vector with different levels of precision. For instance, prediction processing unit 42 may determine the motion vector with integer precision, default precision, or finest motion precision (e.g., ¼ pixel ("pel") precision in HEVC). In some examples, prediction processing unit 42 may encode a syntax element that indicates the precision of the coded Intra BC motion vectors, e.g., in a SPS or VPS referred to by the current picture. In some examples, the precision of the Intra BC motion vectors may be adaptive at the picture level and prediction processing unit 42 may cause entropy encoding unit 56 to encode a syntax element that indicates the precision of the coded Intra BC motion vectors, e.g., in a PPS or slice referred to by the current block.

In some examples, prediction processing unit 42 may perform one or more operations to compensate for the precision level of the Intra BC motion vectors. As one example, before storing blocks into reference picture memory 64, prediction processing unit 42 may left shift x- and y-components of the motion vector of each block coded with Intra BC, such as by 2 when the finest precision is ¼-pel, or by any other means of rounding, such as +/−2 after left shift. As another example, when coding a current slice with Intra BC motion vectors having a precision of integer, prediction processing unit 42 may process a co-located picture in a way that the motion vector of each Intra BC coded block is right shifted, such as by 2 when the finest precision is ¼-pel. In some examples, such as when a current slice is coded with Intra BC motion vectors having the finest motion precision, prediction processing unit 42 may not apply the above process of motion vector right shift.

In some examples, where the current picture is marked as a long-term reference picture, prediction processing unit 42 may still use normal long-term reference pictures to predict the current picture. To prevent a motion vector referring to a normal long-term reference picture and motion vector referring to a current picture from predicting from each other during merge or AMVP, prediction processing unit 42 may distinguish a normal long-term reference picture and the current picture during the merge or AMVP process. For instance, prediction processing unit 42 may distinguish a normal long-term reference picture from the current picture by determining whether the picture order count (POC) value of the reference picture is the same as the POC of the current picture.

Motion compensation, performed by motion compensation unit 46, may involve fetching or generating the predictive block based on the motion vector determined by motion estimation unit 44. Again, motion estimation unit 44 and motion compensation unit 46 may be functionally integrated, in some examples. Upon receiving the motion vector for the PU of the current block, motion compensation unit 46 may locate the predictive block to which the motion vector points in one of the reference picture lists (RPLs). Summer 50 forms a residual video block by subtracting pixel values of the predictive block from the pixel values of the current block being coded, forming pixel difference values, as discussed below. In general, motion estimation unit 44 performs motion estimation relative to luma components, and motion compensation unit 46 uses motion vectors calculated based on the luma components for both chroma components and luma components. Prediction processing unit 42 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may determine an intra-prediction mode to use to encode a current block. In some examples, intra-prediction unit 48 may encode blocks using various intra-prediction modes, e.g., during separate encoding passes, and intra-prediction unit 48 may select an appropriate intra-prediction mode to use from a plurality of intra-prediction modes.

For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 48 may calculate ratios from the distortions and rates for the various encoded blocks to determine which intra-prediction mode exhibits the best rate-distortion value for the block.

In some examples, the plurality of intra-prediction modes available for use by intra-prediction unit 48 may include a planar prediction mode, a DC prediction mode, and one or more angular prediction modes. Regardless of the selected mode, intra-prediction unit 48 may always predict a current block based on reconstructed blocks adjacent to the current block. As one example, when using the planar prediction mode, intra-prediction unit 48 may predict a current block by averaging horizontal and vertical predictions determined. In some examples, intra-prediction unit 48 may determine the horizontal predictions based on a left neighboring block and a top-right neighboring block (as samples of the right neighboring block may not be reconstructed when predicting the current block) and determine the vertical predictions based on a top neighboring block and a bottom-left neighboring block (as samples of the bottom neighboring block may not be reconstructed when predicting the current block).

Figure 4:
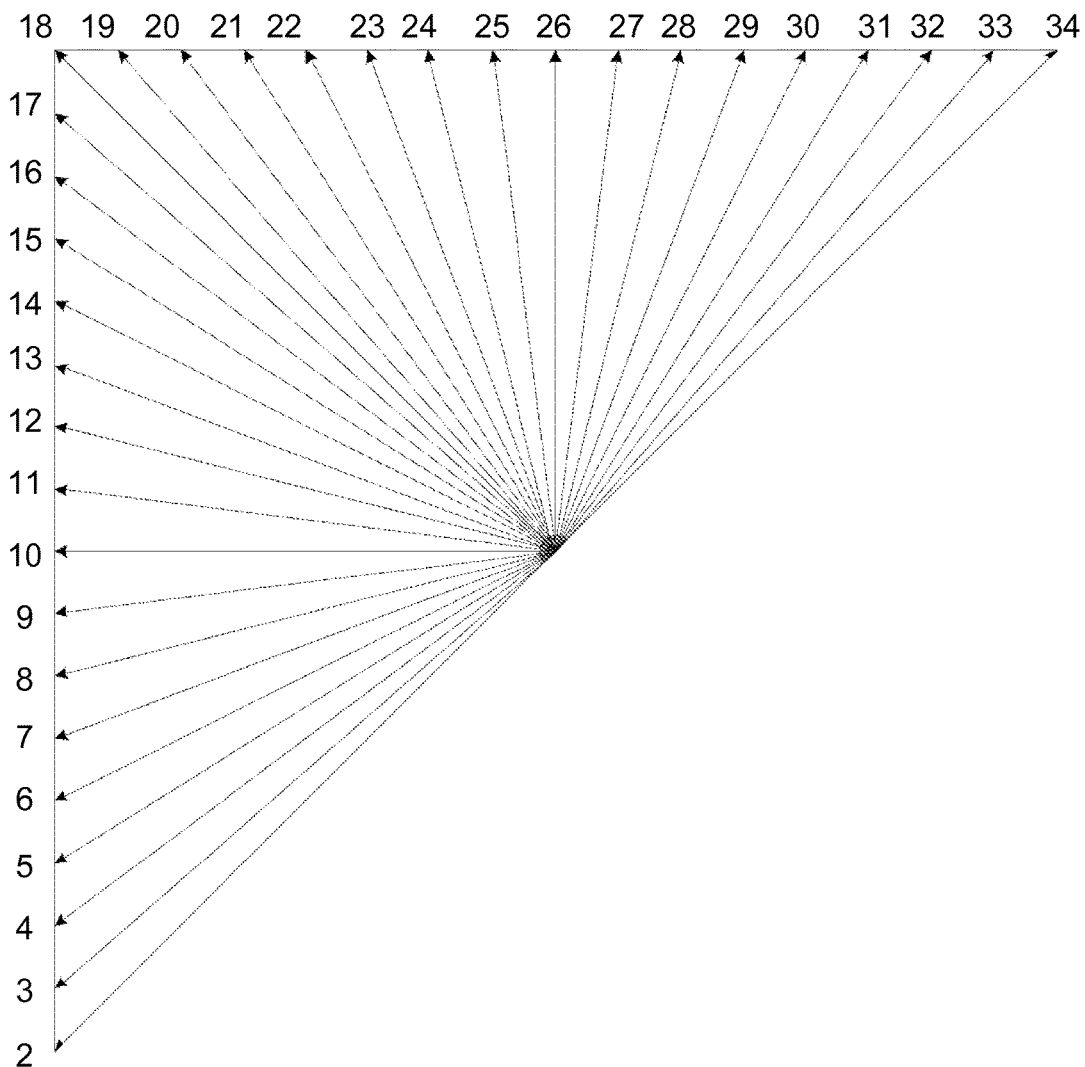
FIG. 4 illustrates an example of angular intra-prediction modes that may be used in accordance with one or more techniques of this disclosure

As another example, when using the DC prediction mode, intra-prediction unit 48 may predict samples of a current block with a constant value. In some examples, the constant value may represent an average of samples in the left-neighboring block and samples in the top neighboring block. As another example, when using one of the one or more angular prediction modes, intra-prediction unit 48 may predict samples of a current block based on samples from a neighboring block indicated by a prediction direction. FIG. 4 illustrates an example of angular intra-prediction modes that may be used by intra-prediction unit 48. The arrows illustrated by FIG. 4 represent a prediction direction (i.e., extending away from the current block).

In some examples, each of the plurality of intra-prediction modes may have a corresponding mode index, which may be signaled (i.e., to a video decoder) by intra-prediction unit 48. The numbers illustrated in FIG. 4 are mode indexes corresponding to the angular intra-prediction modes discussed above. In addition to the mode indexes illustrated by FIG. 4, the planar mode may have an index of 0 and the DC mode may have an index of 1. As discussed above and in accordance with one or more techniques of this disclosure, as opposed to coding a block in a current frame based on an intra mode index, motion estimation unit 44 may predict a block in a current frame based on a predictor block in the current frame identified by a motion vector.

Video encoder 20 forms a residual video block by subtracting the prediction data from prediction processing unit 42 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization processing unit 58 and inverse transform processing unit 60 apply inverse quantization and inverse transformation, respectively, to reconstruct the residual block in the pixel domain, e.g., for later use as a reference block.

Motion compensation unit 46 may also apply one or more interpolation filters to the reference block to calculate sub-integer pixel values for use in motion estimation. Summer 62 adds the reconstructed residual block to the motion compensated prediction block produced by motion compensation unit 46 to produce a reconstructed video block for storage in reference picture memory 64. The reconstructed video block may be used by motion estimation unit 44 and motion compensation unit 46 as a reference block to inter-code a block in a subsequent video picture. In some examples, such as where the current picture is used as a reference picture to predict the current picture, motion compensation unit 46 and/or summer 62 may update the version of the current picture stored by reference picture memory 64 at regular intervals while coding the current picture. As one example, motion compensation unit 46 and/or summer 62 may update the version of the current picture stored by reference picture memory 64 after coding each block of the current picture. For instance, where the samples of the current block are stored in reference picture memory 64 as initialized values, motion compensation unit 46 and/or summer 62 may update the samples of the current of the current picture stored by reference picture memory 64 with the reconstructed samples for the current block.

A filtering unit (not shown) may perform a variety of filtering processes. For example, the filtering unit may perform deblocking That is, the filtering unit may receive a plurality of reconstructed video blocks forming a slice or a frame of reconstructed video and filter block boundaries to remove blockiness artifacts from a slice or frame. In one example, the filtering unit evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

In some examples, motion compensation unit 46 and/or summer 62 may update the version of the current picture stored by reference picture memory 64 before the filtering performs the filtering (e.g., deblocking and/or SAO) to the samples. For instance, the filtering unit may wait until the whole picture is coded before applying the filtering. In this way, motion estimation unit 44 may use the current picture as a reference before applying the filtering. In some examples, the filtering unit may perform the filtering as the version of the current picture stored by reference picture memory 64 is updated. For instance, the filtering unit may apply the filtering as each block is updated. In this way, motion estimation unit 44 may use the current picture as a reference after applying the filtering.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra prediction unit 48, motion compensation unit 46, or entropy encoding unit 56) it should be understood that one or more other units of video encoder 20 may also be responsible for carrying out such techniques.

In this way, video encoder 20 may be configured to implement one or more example techniques described in this disclosure. For example, video encoder 20 may be configured code a block of video data in a current frame using a predictor block included in the current frame. Video encoder 20 may further be configured to output a bitstream that includes a syntax element indicative of whether or not a picture referring to a VPS/SPS/PPS may be present in a reference picture list of the picture itself, e.g., for the purpose of coding one or more blocks of the current picture using Intra BC. That is, when a block is coded using intra BC mode, video encoder 20 may (assuming the syntax element indicates that a current picture can be included in a reference picture list for itself) signal that a reference picture for the block is the picture including the block, e.g., using an index value into a reference picture list such that the index value corresponds to the picture itself. Video encoder 20 may include this index value in motion information of the block that is coded using intra BC mode. In some examples, the hardware architecture of video encoder 20 may not be specifically adapted for using a current picture as a reference picture to predict a current block of the current picture.

Figure 5:
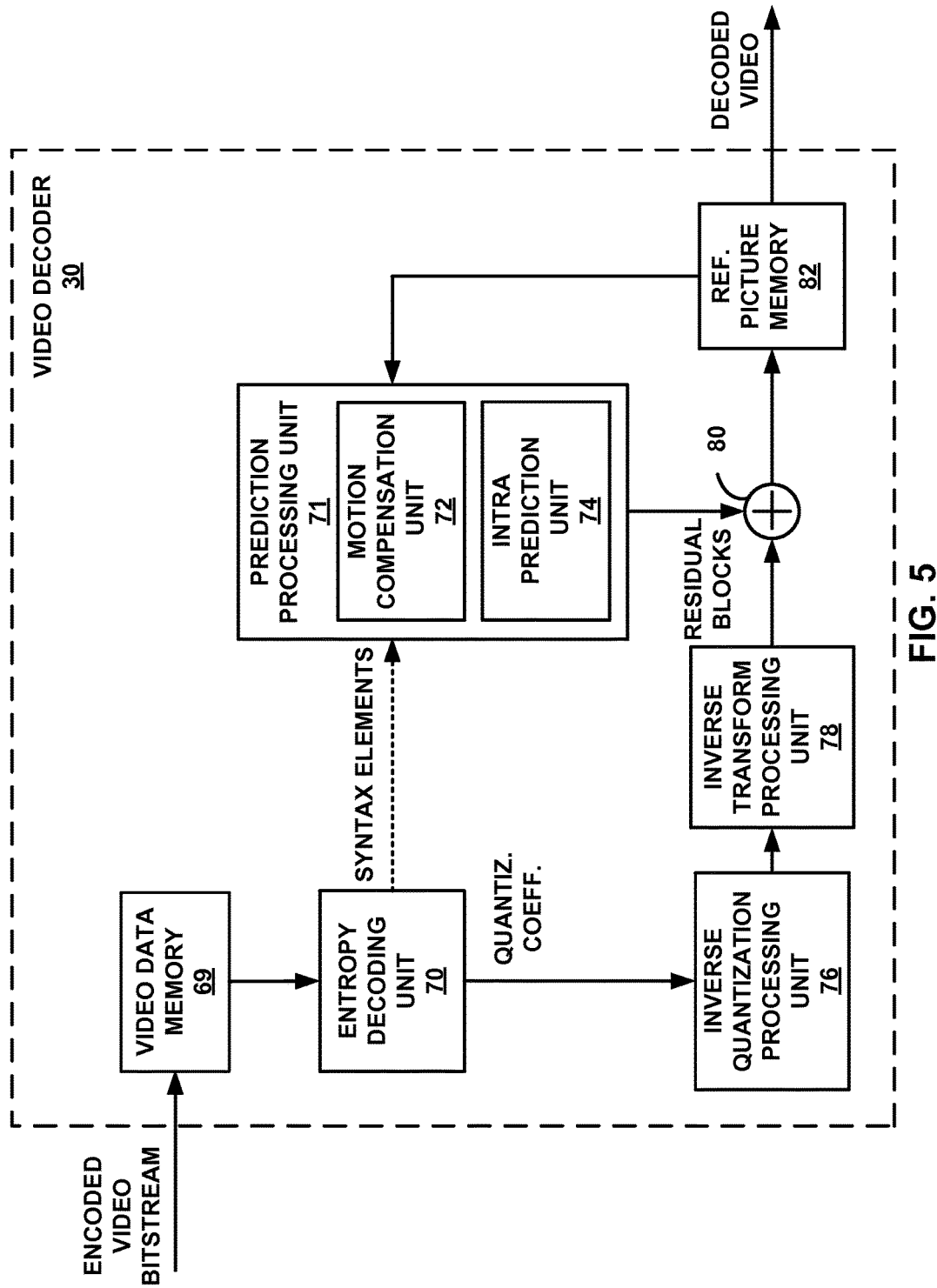
FIG. 5 is a block diagram illustrating an example of video decoder 30 that may implement techniques described in this disclosure.

FIG. 5 is a block diagram illustrating an example of video decoder 30 that may implement techniques described in this disclosure. Again, the video decoder 30 will be described in the context of HEVC coding for purposes of illustration, but without limitation of this disclosure as to other coding standards. Moreover, video decoder 30 may be configured to implement techniques in accordance with the range extensions.

In the example of FIG. 5, video decoder 30 may include video data memory 69, entropy decoding unit 70, prediction processing unit 71, inverse quantization processing unit 76, inverse transform processing unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 3.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In some examples, when the video slice is coded as an intra-coded (I) slice, intra prediction unit 74 may generate prediction data for a video block of the current video slice based on a signaled intra prediction mode and data from previously decoded blocks of the current picture. In some examples, when the video picture is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists (RPLs). Prediction processing unit 71 may construct the RPLs, e.g., List 0 and List 1, using construction techniques based on reference pictures stored in reference picture memory 82.

In accordance with one or more techniques of this disclosure, as opposed to restricting inter-prediction to use other pictures as reference pictures, video decoder 30 may use a current picture as a reference picture to predict blocks of video data included in the current picture. For example, prediction processing unit 71 may store a version of a current picture in prediction processing unit 71. In some examples, prediction processing unit 71 may store an initialized version of the current frame with pixel values initialized to a fixed value. In some examples, the fixed value may be based on a bit depth of samples of the current picture. For instance, the fixed value may be $1<<(bitDepth-1)$. In some examples, prediction processing unit 71 may store the initialized version of the current picture before encoding any blocks of the current picture. By storing an initialized version of the current picture, prediction processing unit 71 may use predictive blocks are not yet reconstructed. By contrast, if prediction processing unit 71 does not store an initialized version of the current picture only blocks that are already reconstructed may be used as predictor blocks (i.e., to avoid a decoder/encoder mismatch).

As discussed above, prediction processing unit 71 may generate one or more RPLs for the current picture. For instance, prediction processing unit 71 may include the current picture an RPL for the current picture. In some examples, prediction processing unit 71 may include the current picture at a particular location within the RPL. As one example, prediction processing unit 71 may insert the current picture in the RPL before pictures in a long-term RPS. For instance, prediction processing unit 71 may insert the current picture in the RPL with an index value less than index values of pictures from a long-term RPS. In some examples, prediction processing unit 71 may insert the current picture in the RPL directly before pictures in a long-term RPS.

As another example, prediction processing unit 71 may insert the current picture in the RPL after inserting pictures from a long-term RPS. For instance, prediction processing unit 71 may insert the current picture in the RPL with an index value greater than index values of pictures in a long-term RPS. In some examples, prediction processing unit 71 may insert the current picture in the RPL directly after inserting pictures from a long-term RPS.

As another example, prediction processing unit 71 may insert the current picture in the RPL at a fixed position. For instance, prediction processing unit 71 may insert the current picture in the RPL with a fixed index value. In some examples, the fixed index value may be −1, or num_ref_idx_l1_active_minus1+1. In some of such examples, prediction processing unit 71 may not receive a flag that indicates that the current block is coded using Intra BC (i.e., intra_bc_flag) from entropy decoding unit 70.

In some examples, such as where motion vectors are predicted using temporal motion vector prediction (TMVP), prediction processing unit 71 may apply one or more constraints such that the current picture is not used as the collocated picture for itself. For instance, prediction processing unit 71 may receive, from entropy decoding unit 70, a syntax element that specifies the reference index of the collocated picture used for TMVP (e.g., collocated_ref_idx) such that RefPicListX[collocated_ref_idx] is not the current picture where X is equal to collocated_from_10_flag.

As discussed above, video decoder 30 may decode a block of video data of a current picture of video data based on a predictive block. In accordance with one or more techniques of this disclosure, motion compensation unit 72 may select a block located in the current picture for use as a predictive block for the current block of the current picture. In particular, prediction processing unit 71 may construct, for a current block, an RPL that includes the current picture, motion compensation unit 72 may receive motion parameters for the current block indicating an index in the RPL. In some examples, the index may identify the current picture in the RPL. When this occurs, motion compensation unit 72 may use a motion vector included in the motion parameters to extract a predicted block from the current picture itself at a position identified by the motion vector relative to the current block. In this way, motion compensation unit 72 may perform Intra BC.

In some examples, prediction processing unit 71 may receive, from entropy decoding unit 70, one or more syntax elements to indicate whether a current picture may be present in a RPL used to predict the current picture. As one example, prediction processing unit 71 may receive a single syntax element that indicates whether pictures of the video data may be present in RPLs used to predict themselves. In some examples, prediction processing unit 71 may receive the single syntax element from a video parameter set (VPS) referred to by the current picture, a sequence parameter set (SPS) referred to by the current picture, or a picture parameter set (PPS) referred to by the current picture.

As another example, prediction processing unit 71 may receive, from entropy decoding unit 70, multiple syntax elements to indicate whether the current picture may be present in a RPL used to predict the current picture. For instance, prediction processing unit 71 may receive a first syntax element that indicates whether pictures of the video data may be present in RPLs used to predict themselves. In some examples, prediction processing unit 71 may receive the first syntax element from a VPS referred to by the current picture, a SPS referred to by the current picture, or a PPS referred to by the current picture. In some examples, such as where the syntax element indicates that pictures of the video data may be present in RPLs used to predict themselves, prediction processing unit 71 may receive a second syntax element that indicates whether the current picture of the video data may be present in the RPL used to predict the current slice. In some examples, prediction processing unit 71 may receive the second syntax element from a slice header of the current slice.

In some examples, prediction processing unit 71 may not receive a syntax element that indicates whether a block is coded using Intra Block Copy (Intra BC). For instance, prediction processing unit 71 may not receive intra_bc_flag in the coding unit syntax of blocks that are predicted using Intra BC in accordance with the techniques of this disclosure.

In some examples, in addition to coding blocks in B-slices and P-slices using Intra BC, prediction processing unit 71 may construct one or more RPLs that include the current picture to decode blocks of an I-slice of the current picture. In some such examples, it may be assumed that the one or more RPLs only include the current picture. In some examples, prediction processing unit 71 may receive a syntax element that indicates whether the current picture may be used as a reference picture of I-slices included in the current picture. In some examples, prediction processing unit 71 may decode the syntax element from a VPS referred to by the current picture, a SPS referred to by the current picture, a PPS referred to by the current picture, or a slice header of a current I-slice. In some examples, prediction processing unit 71 may still use one or both of AMVP and merge. In some examples, prediction processing unit 71 may not receive the target reference index for AMVP for the I-slice from the encoder and may derive the target reference index as a fix value, e.g., 0. In some examples, prediction processing unit 71 may receive the target reference index for AMVP for the I-slice, but the value of the target reference index may be constrained to be a fix value, e.g., 0.

The pictures stored by reference picture memory 82 may be marked as short-term, long-term, another marking, and/or not marked. In some examples, such as when the current slice is an I-slice and Intra BC is enabled, prediction processing unit 71 may mark the current picture as either long-term or short-term. In some examples, such as when the current slice is an I-slice and Intra BC is enabled, prediction processing unit 71 may not mark the current picture as either long-term or short-term.

In some examples, prediction processing unit 71 may mark the current picture as long-term before decoding the current picture and mark the current picture as short-term after decoding the current picture. In some of such examples, such as where the current slice an I-slice, prediction processing unit 71 may generate a merge candidate list to contain candidates referring purely to an Intra BC reference (marked as "long-term") or other candidates that refer to Inter references (marked as "short-term"). In this way, prediction processing unit 71 may generate a candidate list to contain both Intra BC candidates and normal (Inter-prediction) candidates. In some examples, prediction processing unit 71 may bi-directionally predict a merge candidate from an Intra BC reference and an inter-prediction reference. In some of such as examples, such as where the current slice is an inter coded slice (e.g., a B-slice or a P-slice), prediction processing unit 71 may not receive an additional flag indicating flag indicating whether current block is coded with Intra BC (intra_bc_flag).

In some examples, such as where temporal motion vector prediction (TMVP) is enabled and Intra BC is enabled by assuming the current frame is an additional reference picture, prediction processing unit 71 may receive a syntax element that indicates whether the target merge reference picture is the current picture or a first picture in a RPL (e.g., either RefPicList0[0] or RefPicList1[0]). In some examples, prediction processing unit 71 may identify the reference picture by deriving or receiving a target index for a long-term (Intra BC) category of references or a short-term category of references, and applying a different target merge index based on the category of the co-located block's reference picture. For instance, prediction processing unit 71 may identify the reference picture by signaling or deriving a target index for a long-term (Intra BC) category of references or short-term category of references, and based on the category of the co-located block's reference picture, a different target merge index applies.

Prediction processing unit 71 may determine a motion vector that represents a displacement between the current block of video data and the predictor block of video data. In some examples, prediction processing unit 71 may determine the motion vector based on one or more syntax elements received in the encoded video bitstream. In some examples, prediction processing unit 71 may determine the motion vector with integer precision. In such examples, such as where the current picture is a marked as a long-term reference picture, prediction processing unit 71 may not use normal long-term reference pictures to predict the current picture (i.e., long-term reference pictures that are not the current picture). Also, in such examples, prediction processing unit 71 may utilize the advanced motion vector prediction (AMVP) or merge related decoding process as in HEVC version 1 without any change, e.g., as the Intra BC motion vector is predicted only based on Intra BC motion vectors of the spatial and temporal neighboring blocks.

In some examples, prediction processing unit 71 may determine the motion vector with different levels of precision. For instance, prediction processing unit 71 may determine the motion vector with integer precision, default precision, or finest motion precision (e.g., ¼ pel precision in HEVC). In some examples, prediction processing unit 71 may receive a syntax element that indicates the precision of the coded Intra BC motion vectors, e.g., in a SPS or VPS referred to by the current picture. In some examples, the precision of the Intra BC motion vectors may be adaptive at the picture level and prediction processing unit 71 may receive a syntax element that indicates the precision of the coded Intra BC motion vectors, e.g., in a PPS or slice referred to by the current block.

In some examples, prediction processing unit 71 may perform one or more operations to compensate for the precision level of the Intra BC motion vectors. As one example, before storing blocks into reference picture memory 82, prediction processing unit 71 may left shift the motion vector of each block coded with Intra BC, such as by 2 when the finest precision is ¼-pel, or by any other means of rounding, such as +/−2 after left shift. As another example, when coding a current slice with Intra BC motion vectors having a precision of integer, prediction processing unit 71 may process a co-located picture in a way that the motion vector of each Intra BC coded block is right shifted, such as by 2 when the finest precision is ¼-pel. In some examples, such as when a current slice is coded with Intra BC motion vectors having the finest motion precision, prediction processing unit 71 may not apply the above process of motion vector right shift.

In some examples, where the current picture is a marked as a long-term reference picture, prediction processing unit 71 may still use normal long-term reference pictures to predict the current picture. To prevent a motion vector referring to a normal long-term reference picture and motion vector referring to a current picture from predicting from each other during merge or AMVP, prediction processing unit 71 may distinguish a normal long-term reference picture and current picture during the merge or AMVP process.

Motion compensation unit 72 determines prediction information for a video block of the current video slice by parsing the motion vectors and other syntax elements, and uses the prediction information to produce the predictive blocks for the current block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization processing unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform processing unit 78 with the corresponding predictive blocks generated by motion compensation unit 72. Summer 80 represents the component or components that perform this summation operation.

Video decoder 30 may include a filtering unit, which may, in some examples, be configured similarly to the filtering unit of video encoder 20 described above. For example, the filtering unit may be configured to perform deblocking, SAO, or other filtering operations when decoding and reconstructing video data from an encoded bitstream.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

In this way, video decoder 30 may be configured to implement one or more example techniques described in this disclosure. For example, video decoder 30 may be configured to receive a bitstream that includes a syntax element indicative of whether or not a picture referring to a PPS may be present in a reference picture list of the picture itself, e.g., for the purpose of coding one or more blocks of the current picture using intra BC mode. That is, video decoder 30 may decode a value for the syntax element that indicates that a current picture can be included in a reference picture list for itself. Accordingly, when a block is coded using intra BC mode, video decoder 30 may determine that a reference picture for the block is the picture including the block, e.g., using an index value into a reference picture list such that the index value corresponds to the picture itself. Video decoder 30 may decode this index value from motion information of the block that is coded using intra BC mode. In some examples, the hardware architecture of video decoder 30 may not be specifically adapted for using a current picture as a reference picture to predict a current block of the current picture.

Figure 6:
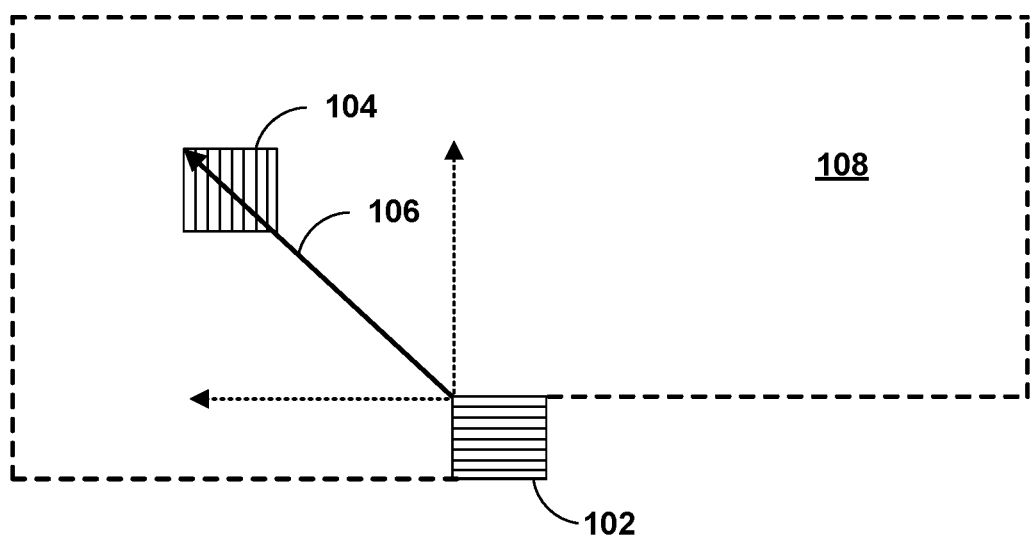
FIG. 6 is a diagram illustrating an example of an intra block copying process, in accordance with one or more techniques of this disclosure.

FIG. 6 is a diagram illustrating an example of an intra block copying process, in accordance with one or more techniques of this disclosure. According to one example intra-prediction process, video encoder 20 may select a predictor video block, e.g., from a set of previously coded and reconstructed blocks of video data. In the example of FIG. 6, reconstructed region 108 includes the set of previously coded and reconstructed video blocks. The blocks in the reconstructed region 108 may represent blocks that have been decoded and reconstructed by video decoder 30 and stored in reconstructed region memory 92, or blocks that have been decoded and reconstructed in the reconstruction loop of video encoder 20 and stored in reconstructed region memory 64. Current block 102 represents a current block of video data to be coded. Predictor block 104 represents a reconstructed video block, in the same picture as current block 102, which is used for Intra BC prediction of current block 102.

In the example intra-prediction process, video encoder 20 may determine and encode motion vector 106, which indicates the position of predictor block 104 relative to current block 102, together with the residue signal. For instance, as illustrated by FIG. 6, motion vector 106 may indicate the position of the upper-left corner of predictor block 104 relative to the upper-left corner of current block 102. As discussed above, motion vector 106 may also be referred to as an offset vector, displacement vector, or block vector (BV). Video decoder 30 may utilize the encoded information for decoding the current block.

As one illustrative example, before decoding a current picture, video decoder 30 may initialize the reconstructed samples of the current picture to 1<<(bitDepth−1). Video decoder 30 may then store a version of the current picture in a reference picture buffer, such as reference picture memory 82, and mark the current picture as a long-term reference. Video decoder 30 may then include the current picture in a reference picture list (RPL) and assign a reference index (e.g., IdxCur (in reference list ListX)) for the current picture in the RPL.

Video decoder 30 may decode, based on the RPL, a block of video data in the current picture based on a predictor block included in the version of the current picture stored in reference picture memory 82. In other words, when decoding a block of the current picture, video decoder 30 may predict the block from the current picture, namely the reference with reference index IdxCur (in ListX). In this case, video decoder 30 may utilize the same MV coding method as that in HEVC version 1. In some examples, video decoder 30 may not restrict the value of MV, e.g., because the video decoder initialized the current picture with the fixed value. Video decoder 30 may write the reconstructed samples of the block to the current picture buffer (e.g., reference picture memory 82) to replace the initialized values (e.g., after the video decoder has finished decoding the block). Note that in this example, video decoder 30 does not apply deblocking, SAO or any other filtering operation to the reconstructed samples after decoding the block. In other words, video decoder 30 may use the current picture as a reference before applying deblocking and SAO.

After coding the whole picture, video decoder 30 may apply deblocking, SAO and other operations such as picture marking in the same way as those described in HEVC version 1. In some examples, video decoder 30 may keep the precision of MV the same as conventional reference pictures (e.g., quarter-pixel precision) when referencing to a block in the current picture. In such examples, video decoder 30 may use the interpolation filter defined in HEVC version 1. In some examples, video decoder 30 may use (in addition to or in place of the interpolation filter defined in HEVC version 1) other interpolation filters, such as bi-linear interpolation filter. In some examples, such as when a MV is referencing to a block in the current picture, video decoder 30 may restrict the precision of MV to integer-pixel. In some examples, video decoder 30 may perform one or more reference picture management techniques involving the current picture, as described above.

As discussed above, in some examples, video encoder 20 may encode one or more syntax elements to indicate whether a current picture may be present in an RPL used to predict the current picture signal the syntax element. For instance, video decoder 30 may signal curr_pic_as_ref_enabled_flag to indicate to video decoder 30 whether or not a picture referring to the PPS may be present in a reference picture list of the picture itself. As one example, video encoder 20 may signal curr_pic_as_ref_enabled_flag as equal to 1 to indicate that a picture referring to the PPS may be present in a reference picture list of the picture itself. As another example, video encoder 20 may signal curr_pic_as_ref_enabled_flag as equal to 0 to indicate that a picture referring to the PPS is not present in a reference picture list of the picture itself. As yet another example, video encoder 20 may not signal curr_pic_as_ref_enabled_flag. In some example, when the syntax element curr_pic_as_ref_enabled_flag is not present, video decoder 30 may infer (i.e., may determine without an explicit indication or signal) the value of curr_pic_as_ref_enabled_flag to be equal to 0. In some examples, video encoder 20 may set a variable NumAddRefPic equal to (curr_pic_as_ref_enabled_flag? 1:0). In the table below, curr_pic_as_ref_enabled is shown in italicized text, to indicate that this syntax element is being added to the picture parameter set. In other examples, this syntax element may be added, additionally or alternatively, to other data structures, e.g., a sequence parameter set (SPS), a video parameter set (VPS), a slice header, or the like.

| | Descriptor |
|---|---|
| pic_parameter_set_rbsp( ) { | |
|     pps_pic_parameter_set_id | ue(v) |
|     pps_seq_parameter_set_id | ue(v) |
|     dependent_slice_segments_enabled_flag | u(1) |
|     output_flag_present_flag | u(1) |
|     num_extra_slice_header_bits | u(3) |
|     sign_data_hiding_enabled_flag | u(1) |
|     cabac_init_present_flag | u(1) |
|     num_ref_idx_l0_default_active_minus1 | ue(v) |
|     num_ref_idx_l1_default_active_minus1 | ue(v) |
|     init_qp_minus26 | se(v) |
|     constrained_intra_pred_flag | u(1) |
|     transform_skip_enabled_flag | u(1) |
|     cu_qp_delta_enabled_flag | u(1) |

-continued

| | Descriptor |
|---|---|
| if( cu_qp_delta_enabled_flag ) | |
|     diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|         for( i = 0; i < num_tile_columns_minus1; i++ ) | |
|             column_width_minus1[ i ] | ue(v) |
|         for( i = 0; i < num_tile_rows_minus1; i++ ) | |
|             row_height_minus1[ i ] | ue(v) |
|     } | |
|     loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|     } | |
| } | |
| pps_scaling_list_data_present_flag | u(1) |
| if( pps_scaling_list_data_present_flag ) | |
|     scaling_list_data( ) | |
| lists_modification_present_flag | u(1) |
| log2_parallel_merge_level_minus2 | ue(v) |
| slice_segment_header_extension_present_flag | u(1) |
| pps_extension_present_flag | u(1) |
| if( pps_extension_present_flag ) { | |
|     for(i = 0; i < 1; i++) | |
|         pps_extension_flag[ i ] | u(1) |
|     pps_extension_7bits | u(7) |
| } | |
| if( pps_extension_flag[ 0 ] ) { | |
|     if( transform_skip_enabled_flag ) | |
|         log2_max_transform_skip_block_size_minus2 | ue(v) |
|     cross_component_prediction_enabled_flag | u(1) |
|     chroma_qp_adjustment_enabled_flag | u(1) |
|     if( chroma_qp_adjustment_enabled_flag ) { | |
|         diff_cu_chroma_qp_adjustment_depth | ue(v) |
|         chroma_qp_adjustment_table_size_minus1 | ue(v) |
|         for( i = 0; i <= chroma_qp_adjustment_table_size_minus1; i++ ) { | |
|             cb_qp_adjustment[ i ] | se(v) |
|             cr_qp_adjustment[ i ] | se(v) |
|         } | |
|     } | |
|     log2_sao_offset_scale_luma | ue(v) |
|     log2_sao_offset_scale_chroma | ue(v) |
|     curr_pic_as_ref_enabled_flag | u(1) |
| } | |
| if( pps_extension_7bits ) | |
|     while( more_rbsp_data( ) ) | |
|         pps_extension_data_flag | u(1) |
| rbsp_trailing_bits( ) | |
| } | |

As discussed above, video decoder 30 may construct one or more reference picture lists that may include the current picture. For instance, in some examples, video decoder 30 may invoke the following process at the beginning of the decoding process for each inter coded slice. In some examples, such as when decoding a P slice, video decoder 30 may construct a single reference picture list RefPicList0. In some examples, such as when decoding a B slice, video decoder 30 may further construct a second independent reference picture list RefPicList1 in addition to RefPicList0.

At the beginning of the decoding process for each slice, video decoder 30 may derive the reference picture lists RefPicList0 and, for B slices, RefPicList1 as follows (where italicized text represents additions relative to the current semantics of the standard):

Video decoder 30 may set the variable NumRpsCurrTempList0 as equal to Max(num_ref_idx_l0_active_minus1+1, NumPocTotalCurr+NumAddRefPic) and construct the list RefPicListTemp0 as follows, where currPic is the current picture:

```
rIdx = 0
while( rIdx < NumRpsCurrTempList0 ) {
    for( i = 0; i < NumPocStCurrBefore && rIdx <
       NumRpsCurrTempList0; rIdx++, i++ )
        RefPicListTemp0[ rIdx ] = RefPicSetStCurrBefore[ i ]
    if( curr_pic_as_ref_enabled_flag )
        RefPicListTemp0[ rIdx ] = currPic
    for( i = 0; i < NumPocStCurrAfter && rIdx <
NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0;
rIdx++, i++ )
        RefPicListTemp0[ rIdx ] = RefPicSetLtCurr[ i ]
}
```

Video decoder 30 may construct the list RefPicList0 as follows, where currPic is the current picture:

```
for( rIdx = 0; rIdx <= num_ref_idx_l0_active_minus1; rIdx++)
    RefPicList0[ rIdx ] = ref_pic_list_modification_flag_l0 ?
        RefPicListTemp0[ list_entry_l0[ rIdx ] ] : RefPicListTemp0[ rIdx ]
```

In some examples, such as when the slice is a B slice, video decoder 30 may set the variable NumRpsCurrTempList1 as equal to Max(num_ref_idx_l1_active_minus1+1, NumPocTotalCurr+NumAddRefPic) and construct the list RefPicListTemp1 as follows:

```
rIdx = 0
while( rIdx < NumRpsCurrTempList1 ) {
    for( i = 0; i < NumPocStCurrAfter && rIdx <
NumRpsCurrTempList1; rIdx++, i++ )
        RefPicListTemp1[ rIdx ] = RefPicSetStCurrAfter[ i ]
    if( curr_pic_as_ref_enabled_flag )
        RefPicListTemp0[ rIdx ] = currPic
    for( i = 0; i < NumPocStCurrBefore && rIdx <
NumRpsCurrTempList1; rIdx++, i++ )
        RefPicListTemp1[ rIdx ] = RefPicSetStCurrBefore[ i ]
    for( i = 0; i < NumPocLtCurr && rIdx < NumRpsCurrTempList1;
rIdx++, i++ )
        RefPicListTemp1[ rIdx ] = RefPicSetLtCurr[ i ]
}
```

In some examples, such as when the slice is a B slice, video decoder 30 may construct the list RefPicList1 as follows:

```
for( rIdx = 0; rIdx <= num_ref_idx_l1_active_minus1; rIdx++)
    RefPicList1[ rIdx ] = ref_pic_list_modification_flag_l1 ?
        RefPicListTemp1[ list_entry_l1[ rIdx ] ] : RefPicListTemp1[ rIdx ]
```

Figure 7:
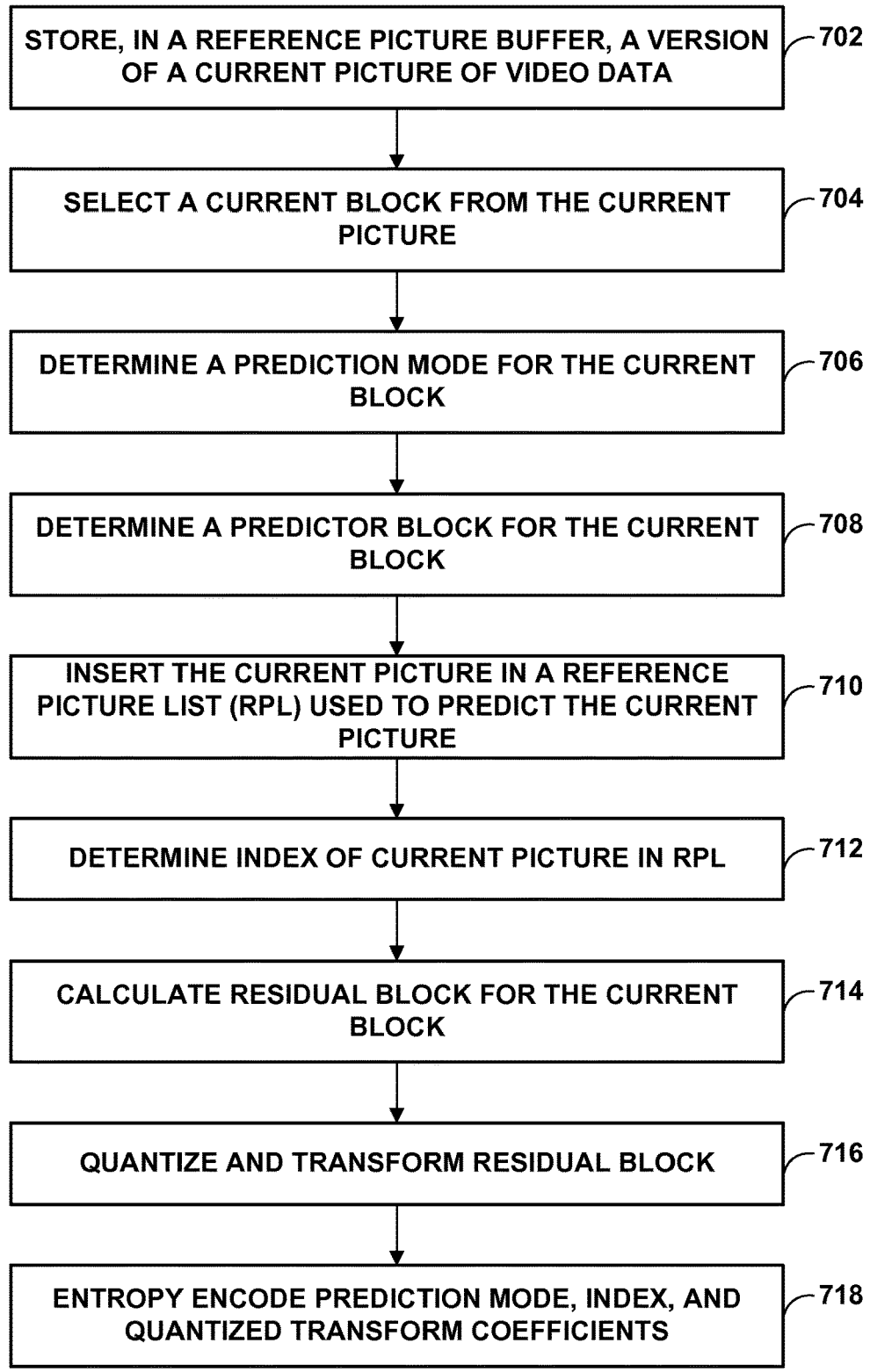
FIG. 7 is a flow diagram illustrating example operations of a video encoder to encode a block of video data of a picture based on a predictor block included in the same picture, in accordance with one or more techniques of the present disclosure.

FIG. 7 is a flow diagram illustrating example operations of a video encoder to encode a block of video data of a picture based on a predictor block included in the same picture, in accordance with one or more techniques of the present disclosure. The techniques of FIG. 7 may be performed by one or more video encoders, such as video encoder 20 illustrated in FIGS. 1 and 3. For purposes of illustration, the techniques of FIG. 7 are described within the context of video encoder 20, although video encoders having configurations different than that of video encoder 20 may perform the techniques of FIG. 7.

In accordance with one or more techniques of this disclosure, video encoder 20 may store, in a reference picture buffer, a version of a current picture of video data (702). For instance, prediction processing unit 42 may store an initialized version of the current picture in reference picture memory 64.

Video encoder 20 may select a current block (704), and determine a prediction mode for the current block (706). Video encoder 20 may select the prediction mode from among a variety of different modes, which may be tested using, e.g., BD-rate, and video encoder 20 may select the mode that yields the best BD-rate performance. In the example of FIG. 7, video encoder 20 determine to encode the current block using Intra BC.

Video encoder 20 may determine a predictor block for the current block (708). For instance, video encoder 20 may determine the prediction block as a block in the current picture found to closely match the current block, in terms of pixel difference, which may be determined by sum of absolute difference (SAD), sum of square difference (SSD), or other difference metrics.

Video encoder 20 may insert the current picture in a reference picture list (RPL) used to predict the current picture (710). In some examples, video encoder 20 may encode a syntax element that indicates whether pictures of the video data may be present in RPLs used to predict themselves (e.g., curr_pic_as_ref_enabled_flag). As discussed above, in some examples, video encoder 20 may insert the current picture in the RPL with: an index value less than index values of pictures in a long-term RPS, an index value greater than index values of pictures in a long-term RPS, or a fixed index value. In some examples, video encoder 20 may construct the RPL used to predict the current picture such that the RPL used to predict the current picture only includes the current picture. For instance, where the current block is included in a current intra slice (e.g., an I-slice), video encoder 20 may construct the RPL used to predict blocks of the current intra slice such that the RPL used to predict the blocks of the current intra slice only includes the current picture. In some examples, video encoder 20 may construct the RPL used to predict the current picture such that the RPL used to predict the current picture includes the current picture and one or more other pictures of video data. For instance, where the current block is included in a current inter slice (e.g., a B-slice or a P-slice), video encoder 20 may construct the RPL used to predict blocks of the current inter slice such that the RPL used to predict the blocks of the current intra slice includes the current picture and one or more other pictures of video data.

Video encoder 20 may determine an index of the current picture in the RPL (712). For instance, where the current picture is inserted into the RPL with a fixed index value, video encoder 20 may determine that the index of the current picture in the RPL is the fixed index value.

Video encoder 20 may calculate a residual block for the current block (714). For instance, summer 50 may subtract samples of the current block from samples of the determined predictor block to calculate the residual block.

Video encoder 20 may quantize and transform the residual block (716). For instance, transform processing unit 52 of video encoder 20 may apply a transform, such as a discrete cosine transform (DCT) or a conceptually similar transform, to the residual block, producing a video block comprising residual transform coefficient values. Quantization processing unit 54 of video encoder 20 may quantize the transform coefficients to further reduce bit rate.

Video encoder 20 may entropy encode the prediction mode, the index, and quantized transform coefficients (718). For instance, entropy encoding unit 56 may entropy encode the prediction mode of the current block, the index of the reference picture for the current block (that may be the index of the current block in the RPL), and the quantized transform coefficients. In this way, video encoder 20 may perform Intra BC.

In some examples, video encoder 20 may perform the example operations in the order illustrated in FIG. 7. In some examples, video encoder 20 may perform the example operations in an order other than the order illustrated in FIG. 7. For instance, in some examples, video encoder 20 may insert the current picture in the RPL used to predict the current picture (710) before selecting the current block from the current picture (704). For example, where the current block is included in a current slice, video encoder 20 may insert the current picture in the RPL used to predict the current picture before encoding any blocks of the current slice.

Figure 8:
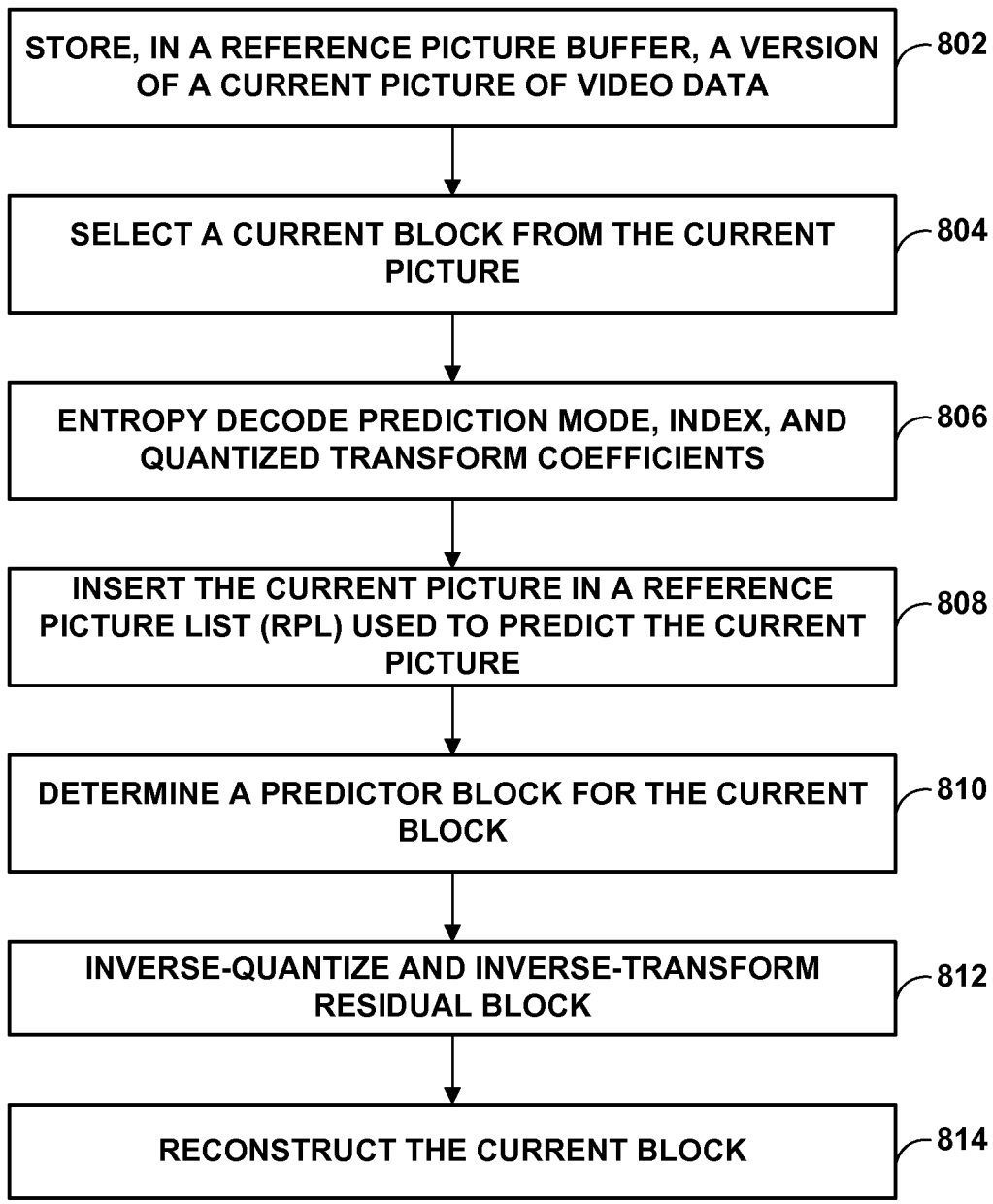
FIG. 8 is a flow diagram illustrating example operations of a video decoder to decode a block of video data of a picture based on a predictor block included in the same picture, in accordance with one or more techniques of the present disclosure.

FIG. 8 is a flow diagram illustrating example operations of a video decoder to decode a block of video data of a picture based on a predictor block included in the same picture, in accordance with one or more techniques of the present disclosure. The techniques of FIG. 8 may be performed by one or more video decoders, such as video decoder 30 illustrated in FIGS. 1 and 5. For purposes of illustration, the techniques of FIG. 8 are described within the context of video decoder 30, although video decoders having configurations different than that of video decoder 30 may perform the techniques of FIG. 8.

In accordance with one or more techniques of this disclosure, video decoder 30 may store, in a reference picture buffer, a version of a current picture of video data (802). For instance, prediction processing unit 71 may store an initialized version of the current picture in reference picture memory 82.

Video decoder 30 may select a current block from the current picture (804), and entropy decode a prediction mode, an index of a reference picture, and quantized transform coefficients for the current block (806). For instance, entropy decoding unit 70 may entropy one or more syntax elements that indicate that the prediction mode for the current block is Intra BC and the index of a reference picture used to predict the current block (e.g., ref_idx_1X). In the example of FIG. 8, the reference picture used to predict the current block may be the current picture.

Video decoder 30 may insert the current picture in a reference picture list (RPL) used to predict the current picture (808). In some examples, video decoder 30 may determine whether to insert the current picture in the RPL based on the presence/value of one or more syntax elements. For instance, video decoder 30 may determine whether to insert the current picture in the RPL based on a value of a syntax element that indicates whether pictures of the video data may be present in RPLs used to predict themselves (e.g., curr_pic_as_ref_enabled_flag). As discussed above, in some examples, video decoder 30 may insert the current picture in the RPL with: an index value less than index values of pictures in a long-term RPS, an index value greater than index values of pictures in a long-term RPS, or a fixed index value. In some examples, video decoder 30 may constructing the RPL used to predict the current picture such that the RPL used to predict the current picture only includes the current picture. In some examples, video decoder 30 may construct the RPL used to predict the current picture such that the RPL used to predict the current picture includes the current picture and one or more other pictures of video data.

Video decoder 30 may determine a predictor block for the current block (810). For instance, prediction processing unit 71 may determine the predictor block for the current block based on the index of the reference picture, which may refer to the index of the current picture in the RPL, and a motion vector that indicates a displacement between the current block and the predictor block.

Video decoder 30 may inverse-quantize and inverse-transform the residual block (812). For instance, inverse quantization processing unit 76 may inverse quantize, i.e., de-quantizes, the quantized transform coefficients decoded by entropy decoding unit 70. Inverse transform processing unit 78 may apply an inverse transform, e.g., an inverse DCT, an inverse integer transform, or a conceptually similar inverse transform process, to the transform coefficients in order to produce residual blocks in the pixel domain.

Video decoder 30 may reconstruct the current block (814). For instance, summer 80 may add the residual block to the predictor block to reconstruct the current block. Video decoder 30 may update, after reconstructing the current block, the version of the current picture in the reference picture buffer with an updated version of the current picture that included the coded current block. For instance, summer 80 may store the reconstructed samples of the current block in reference picture memory 82, e.g., to enable a subsequent block to use one or more reconstructed samples of the current block as some or all of a predictor block. In this way, video decoder 30 may perform Intra BC.

In some examples, video decoder 30 may perform the example operations in the order illustrated in FIG. 8. In some examples, video decoder 30 may perform the example operations in an order other than the order illustrated in FIG. 8. For instance, in some examples, video decoder 30 may insert the current picture in the RPL used to predict the current picture (808) before selecting the current block from the current picture (804). For example, where the current block is included in a current slice, video decoder 30 may insert the current picture in the RPL used to predict the current picture before encoding any blocks of the current slice.

The following numbered examples may illustrate one or more aspects of the disclosure:

1. A method of encoding or decoding video data, the method comprising: storing, by a video coder and in a reference picture buffer, a version of a current picture of the video data; inserting an indication of the current picture in a reference picture list (RPL) used during prediction of blocks of the current picture; and coding, by the video coder and based on the RPL, a first block of video data in the current picture based on a predictor block of video data included in the version of the current picture stored in the reference picture buffer.

2. The method of claim 1, further comprising: updating, by the video coder and after coding the first block, the version of the current picture in the reference picture buffer with an updated version of the current picture that includes the coded first block; and coding, by the video coder and based on the RPL, a second block of video data in the current picture based on a predictor block included in the updated version of the current picture stored in the reference picture buffer.

3. The method of claim 1, further comprising: coding, by the video coder, a syntax element that indicates whether pictures of the video data may be present in RPLs used to predict the pictures themselves; and determining to include the current picture of the video data in the RPL used to predict the current picture based on the syntax element.

4. The method of claim 3, wherein coding the syntax element comprises coding the syntax element in a video parameter set (VPS) referred to by the current picture, a sequence parameter set (SPS) referred to by the current picture, or a picture parameter set (PPS) referred to by the current picture.

5. The method of claim 4, wherein the syntax element is a first syntax element and the first block is included in a current slice of the current picture, the method further comprising: coding, by the video coder and based on the first syntax element indicating that pictures of the video data may be present in RPLs used to predict the pictures themselves, a second syntax element that indicates whether the current picture of the video data may be present in the RPL used to predict the current slice, wherein the second syntax element is included in a header of the current slice, wherein the determination to insert the current picture of the video data in the RPL used to predict the current picture is further based on the second syntax element.

6. The method of claim 5, wherein coding the second syntax element comprises coding the second syntax element in a header of the current slice before other syntax elements related to modifying the RPL used to predict the current slice.

7. The method of claim 4, wherein the method does not include coding a syntax element that indicates whether the first block is coded using Intra Block Copy (Intra BC).

8. The method of claim 1, wherein the block is included in a current slice of the current picture, and wherein a syntax element indicating a collocated reference index for the current slice indicates a picture that is not the current picture.

9. The method of claim 1, wherein the block is included in a current slice of the current picture, and wherein the predictor block is included in the current slice.

10. The method of claim 1, wherein each entry in the RPL has an index value, wherein inserting the current picture in the RPL used to predict the current picture comprises constructing the RPL used to predict the current picture based on one or more reference picture sets (RPSs) by at least: inserting the current picture in the RPL with an index value less than index values of pictures in a long-term RPS; inserting the current picture in the RPL with an index value greater than index values of pictures in a long-term RPS; or inserting the current picture in the RPL with a fixed index value.

11. The method of claim 1, wherein the block is included in a current slice of the current picture, wherein the current slice is an intra slice, and wherein inserting the current picture in the RPL used to predict the current picture comprises constructing the RPL used to predict the current picture such that the RPL used to predict the current picture only includes the current picture.

12. The method of claim 1, wherein the block is included in a current slice of the current picture, wherein the current slice is an inter slice, and wherein inserting the current picture in the RPL used to predict the current picture comprises constructing the RPL used to predict the current picture such that the RPL used to predict the current picture includes the current picture and one or more other pictures of video data.

13. The method of claim 1, further comprising: marking, by the video coder and before coding the block of the current picture, the current picture of the video data as a long-term reference picture; and marking, by the video coder and after coding the block of the current picture, the current picture of the video data as a short-term reference picture.

14. The method of claim 1, wherein coding the block comprises encoding the block, the method further comprising encoding, in an encoded video bitstream, a representation of a vector that represents a displacement between the block of video data and the predictor block of video data.

15. The method of claim 1, wherein coding the block comprises decoding the block, the method further comprising determining, based on an encoded video bitstream, a vector that represents a displacement between the block of video data and the predictor block of video data.

16. The method of claim 1, wherein storing the version of the current picture in the reference picture buffer comprises: storing, by the video coder and in the reference picture buffer, a version of the current picture with sample pixel values initialized to a fixed value.

17. A device for encoding or decoding video data, the device comprising: a reference picture buffer configured to store one or more pictures of the video data; and one or more processors configured to perform the method of any combination of examples 1-16.

18. A device for encoding or decoding video data, the device comprising means for performing the method of any combination of examples 1-16.

19. A computer-readable storage medium storing instructions that, when executed, cause one or more processors of a video coder to perform the method of any combination of examples 1-16.

Certain aspects of this disclosure have been described with respect to the HEVC standard for purposes of illustration. However, the techniques described in this disclosure may be useful for other video coding processes, including other standard or proprietary video coding processes not yet developed, such as the H.266 video coding standard currently in development.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   storing, by a video coder and in a reference picture buffer, a set of reconstructed blocks of a current picture of the video data;
   assigning an index value to the current picture in a reference picture list (RPL) used during prediction of blocks of the current picture;
   determining that motion information of a current block of the current picture specifies the index value of the current picture in the reference picture list and a position of a reference block in the current picture, the reference block being a block among the set of reconstructed blocks of the current picture;
   in response to the determination, forming a predictor block from the reference block among the set of reconstructed blocks of the current picture stored in the reference picture buffer; and
   reconstructing, by the video coder and based on the RPL, pixel values of the current block of video data in the current picture based on a sum of residual pixel data and pixel values of the predictor block formed from the reference block among the set of reconstructed blocks of the current picture of video data.

2. The method of claim 1, further comprising:
   updating, by the video coder and after coding the current block, the set of reconstructed blocks of the current picture in the reference picture buffer with the coded current block; and
   reconstructing, by the video coder and based on the RPL, pixel values of a second block of video data in the current picture based on a sum of residual pixel data for the second block and pixel values of a second predictor block formed from among the updated set of reconstructed blocks of the current picture stored in the reference picture buffer.

3. The method of claim 1, further comprising:
   coding, by the video coder, a syntax element indicating that pictures of the video data are allowed to be assigned index values in RPLs used to predict the pictures themselves; and
   determining to assign the index value to the current picture of the video data in the RPL used to predict the current picture based on the syntax element.

4. The method of claim 3, wherein coding the syntax element comprises coding the syntax element in a video parameter set (VPS) referred to by the current picture, a sequence parameter set (SPS) referred to by the current picture, or a picture parameter set (PPS) referred to by the current picture.

5. The method of claim 4, wherein the method does not include coding a syntax element that indicates whether the current block is coded using Intra Block Copy (Intra BC).

6. The method of claim 1, wherein the current block is included in a current slice of the current picture, and wherein a syntax element indicating a collocated reference index for the current slice indicates a picture that is not the current picture.

7. The method of claim 1, wherein the current block is included in a current slice of the current picture, and wherein the predictor block is included in the current slice.

8. The method of claim 1, wherein each entry in the RPL has a respective index value, wherein assigning the index value to the current picture in the RPL used to predict the current picture comprises constructing the RPL used to predict the current picture based on one or more reference picture sets (RPSs) by at least:
   assigning the current picture an index value less than index values of pictures in a long-term RPS;
   assigning the current picture an index value greater than index values of pictures in a long-term RPS; or
   assigning the current picture a fixed index value.

9. The method of claim 1, wherein the current block is included in a current slice of the current picture, wherein the current slice is an intra slice, and wherein assigning the index value to the current picture in the RPL used to predict the current picture comprises constructing the RPL used to predict the current picture such that the RPL used to predict the current picture only includes the current picture.

10. The method of claim 1, wherein the current block is included in a current slice of the current picture, wherein the current slice is an inter slice, and wherein assigning the index value to the current picture in the RPL used to predict the current picture comprises constructing the RPL used to predict the current picture such that the RPL used to predict the current picture includes the current picture and one or more other pictures of video data.

11. The method of claim 1, further comprising:
marking, by the video coder and before coding the current block of the current picture, the current picture of the video data as a long-term reference picture; and
marking, by the video coder and after coding the current block of the current picture, the current picture of the video data as a short-term reference picture.

12. The method of claim 1, further comprising encoding, in an encoded video bitstream, a representation of a vector that represents a displacement between the current block of video data and the predictor block of video data.

13. The method of claim 1, further comprising determining, based on an encoded video bitstream, a vector that represents a displacement between the current block of video data and the predictor block of video data.

14. A device for encoding or decoding video data, the device comprising:
a reference picture buffer configured to store one or more pictures of the video data; and
one or more processors configured to:
store, in a reference picture buffer, a set of reconstructed blocks of a current picture of the video data;
assign an index value to the current picture in a reference picture list (RPL) used during prediction of blocks of the current picture;
determine that motion information of a current block of the current picture specifies the index value of the current picture in the reference picture list and a position of a reference block in the current picture, the reference block being a block among the set of reconstructed blocks of the current picture;
in response to the determination, form a predictor block from the reference block among the set of reconstructed blocks of the current picture stored in the reference picture buffer; and
reconstruct, by the video coder and based on the RPL, pixel values of the current block of video data in the current picture based on a sum of residual pixel data and pixel values of the predictor block of video data included.

15. The device of claim 14, wherein the one or more processors are further configured to:
update, after coding the current block, the set of reconstructed blocks of the current picture in the reference picture buffer with the coded current block; and
reconstruct, based on the RPL, pixel values of a second block of video data in the current picture based on a sum of residual pixel data for the second block and pixel values of a second predictor block formed from among the updated set of reconstructed blocks of the current picture stored in the reference picture buffer.

16. The device of claim 14, wherein the one or more processors are further configured to:
code a syntax element indicating that pictures of the video data are allowed to be assigned index values in RPLs used to predict the pictures themselves; and
determine to assign the index value to the current picture of the video data in the RPL used to predict the current picture based on the syntax element.

17. The device of claim 16, wherein the one or more processors are configured to code the syntax element in a video parameter set (VPS) referred to by the current picture, a sequence parameter set (SPS) referred to by the current picture, or a picture parameter set (PPS) referred to by the current picture.

18. The device of claim 17, wherein the one or more processors are not configured to code a syntax element that indicates whether the current block is coded using Intra Block Copy (Intra BC).

19. The device of claim 14, wherein the current block is included in a current slice of the current picture, and wherein a syntax element indicating a collocated reference index for the current slice indicates a picture that is not the current picture.

20. The device of claim 14, wherein the current block is included in a current slice of the current picture, and wherein the predictor block is included in the current slice.

21. The device of claim 14, wherein each entry in the RPL has a respective index value, and wherein, to insert the current picture in the RPL used to predict the current picture, the one or more processors are configured construct the RPL used to predict the current picture based on one or more reference picture sets (RPSs) by at least:
assigning the current picture an index value less than index values of pictures in a long-term RPS;
assigning the current picture an index value greater than index values of pictures in a long-term RPS; or
assigning the current picture a fixed index value.

22. The device of claim 14, wherein the current block is included in a current slice of the current picture, wherein the current slice is an intra slice, and wherein, to assign the index value to the current picture in the RPL used to predict the current picture, the one or more processors are configured construct the RPL used to predict the current picture such that the RPL used to predict the current picture only includes the current picture.

23. The device of claim 14, wherein the current block is included in a current slice of the current picture, wherein the current slice is an inter slice, and wherein, to assign the index value to the current picture in the RPL used to predict the current picture, the one or more processors are configured construct the RPL used to predict the current picture such that the RPL used to predict the current picture includes the current picture and one or more other pictures of video data.

24. The device of claim 14, wherein the one or more processors are further configured to:
mark, before coding the current block of the current picture, the current picture of the video data as a long-term reference picture; and
mark, after coding the current block of the current picture, the current picture of the video data as a short-term reference picture.

25. The device of claim 14, wherein the video coder is a video encoder, and wherein the one or more processors are further configured to encode, in an encoded video bitstream, a representation of a vector that represents a displacement between the current block of video data and the predictor block of video data.

26. The device of claim 14, wherein the video coder is a video decoder, and wherein the one or more processors are further configured to determine, based on an encoded video bitstream, a vector that represents a displacement between the current block of video data and the predictor block of video data.

27. A device for encoding or decoding video data comprising:
means for storing, in a reference picture buffer, a set of reconstructed blocks of a current picture of the video data;
means for assigning an index value to the current picture in a reference picture list (RPL) used during prediction of blocks of the current picture;
means for determining that motion information of a current block of the current picture specifies the index value of the current picture in the reference picture list and a position of a reference block in the current picture, the reference block being a block among the set of reconstructed blocks of the current picture;
means for forming, responsive to the determination, a predictor block from the reference block among the set of reconstructed blocks of the current picture stored in the reference picture buffer; and
means for reconstructing, based on the RPL, pixel values of a current block of video data in the current picture based on a sum of residual pixel data and pixel values of the predictor block of video data.

28. The device of claim 27, further comprising:
means for coding a syntax element indicating that pictures of the video data are allowed to be assigned index values in RPLs used to predict themselves; and
means for determining whether to assign the index value to the current picture of the video data in the RPL used to predict the current picture based on the syntax element.

29. A computer-readable storage medium storing instructions that, when executed, cause one or more processors of a video coder to:
store, in a reference picture buffer, a set of reconstructed blocks of a current picture of the video data;
assign an index value to the current picture in a reference picture list (RPL) used during prediction of blocks of the current picture;
determine that motion information of a current block of the current picture specifies the index value of the current picture in the reference picture list and a position of a reference block in the current picture, the reference block being a block among the set of reconstructed blocks of the current picture;
in response to the determination, form a predictor block from the reference block among the set of reference blocks of the current picture stored in the reference picture buffer; and
reconstruct, based on the RPL, pixel values of a current block of video data in the current picture based on a sum of residual pixel data and pixel values of the predictor block of video data.

30. The computer-readable storage medium of claim 29, further storing instructions that, when executed, cause the one or more processors of a video coder to:
code a syntax element indicating that pictures of the video data are allowed to be assigned index values in RPLs used to predict themselves; and
determine whether to assign the index value to the current picture of the video data in the RPL used to predict the current picture based on the syntax element.

31. The method of claim 3, wherein coding the syntax element comprises:
coding, by the video coder and in a sequence parameter set (SPS) referred to by the current picture, a first syntax element indicating that pictures of the video data are allowed to be assigned index values in RPLs used to predict the pictures themselves; and
coding, by the video coder and in a picture parameter set (PPS) referred to by the current picture, a second syntax element indicating that pictures of the video data are allowed to be assigned index values in RPLs used to predict the pictures themselves.

32. The device of claim 16, wherein, to code the syntax element, the one or more processors are configured to:
code, in a sequence parameter set (SPS) referred to by the current picture, a first syntax element indicating that pictures of the video data are allowed to be assigned index values in RPLs used to predict the pictures themselves; and
code, in a picture parameter set (PPS) referred to by the current picture, a second syntax element indicating that pictures of the video data are allowed to be assigned index values in RPLs used to predict the pictures themselves.

33. The device of claim 28, wherein the means for coding the syntax element comprise:
means for coding, in a sequence parameter set (SPS) referred to by the current picture, a first syntax element indicating that pictures of the video data are allowed to be assigned index values in RPLs used to predict the pictures themselves; and
means for coding, in a picture parameter set (PPS) referred to by the current picture, a second syntax element indicating that pictures of the video data are allowed to be assigned index values in RPLs used to predict the pictures themselves.

34. The computer-readable storage medium of claim 30, wherein the instructions that cause the one or more processors to code the syntax element comprise instructions that cause the one or more processors to:
code, in a sequence parameter set (SPS) referred to by the current picture, a first syntax element indicating that pictures of the video data are allowed to be assigned index values in RPLs used to predict the pictures themselves; and
code, in a picture parameter set (PPS) referred to by the current picture, a second syntax element indicating that pictures of the video data are allowed to be assigned index values in RPLs used to predict the pictures themselves.

* * * * *